(12) United States Patent
Yamashita et al.

(10) Patent No.: US 11,360,584 B2
(45) Date of Patent: Jun. 14, 2022

(54) ELECTRONIC PEN

(71) Applicant: Wacom Co., Ltd., Saitama (JP)

(72) Inventors: Shigeru Yamashita, Saitama (JP);
Ryoji Kamiyama, Ibaraki (JP);
Masamitsu Ito, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 17/489,318

(22) Filed: Sep. 29, 2021

(65) Prior Publication Data

US 2022/0019300 A1    Jan. 20, 2022

Related U.S. Application Data

(63) Continuation of application No. 16/995,399, filed on Aug. 17, 2020, now Pat. No. 11,169,625, which is a
(Continued)

(30) Foreign Application Priority Data

Mar. 24, 2017 (JP) .............................. JP2017-058815

(51) Int. Cl.
*G06F 3/0354* (2013.01)
*G06F 3/041* (2006.01)
*G06F 3/038* (2013.01)

(52) U.S. Cl.
CPC ........ *G06F 3/03545* (2013.01); *G06F 3/0383* (2013.01); *G06F 3/0414* (2013.01)

(58) Field of Classification Search
CPC ... G06F 3/03545; G06F 3/0383; G06F 3/0414
See application file for complete search history.

(56) References Cited

U.S. PATENT DOCUMENTS

| | | | | |
|---|---|---|---|---|
| 5,633,471 A | * | 5/1997 | Fukushima | ......... G06F 3/03545 73/865.4 |
| 9,335,840 B1 | * | 5/2016 | Chou | .................... G06F 3/0383 |

(Continued)

FOREIGN PATENT DOCUMENTS

| | | |
|---|---|---|
| EP | 2 624 104 A2 | 8/2013 |
| JP | 61-176640 U | 11/1986 |

(Continued)

OTHER PUBLICATIONS

Extended European Search Report for corresponding European Application No. 18772643.5-1216, dated Feb. 28, 2020, 9 pages.
(Continued)

*Primary Examiner* — Andrew Sasinowski
(74) *Attorney, Agent, or Firm* — Seed Intellectual Property Law Group LLP

(57) ABSTRACT

A work step of electrical connection between a writing pressure detector and a circuit element of a circuit is reduced. An electronic pen includes a writing pressure detector that detects a pressure applied to a core body disposed on one end side of a tubular chassis in the axial center direction, a circuit board for which a flexible substrate formed into a shape allowed to extend in the axial center direction is used in the chassis, and a holder housed in the chassis in such a manner as to hold the writing pressure detector and the circuit board and extend in the axial center direction. In the circuit board, a writing pressure detector placement part, a circuit placement part at which a predetermined circuit is formed, and a line part at which a line pattern that electrically connects a component of the writing pressure detector placed on the writing pressure detector placement part and a circuit element of the circuit placement part is formed are formed to line up in the axial center direction. The writing pressure detector placement part of the circuit board is held by the holder in the state of being (Continued)

along a direction perpendicular to the axial center direction in such a manner that the writing pressure detector can receive a pressure in the axial center direction applied to the core body through bending of the flexible substrate at a part of the line part.

20 Claims, 12 Drawing Sheets

Related U.S. Application Data continuation of application No. 16/542,120, filed on Aug. 15, 2019, now Pat. No. 10,768,720, which is a continuation of application No. PCT/JP2018/000176, filed on Jan. 9, 2018.

(56) References Cited

U.S. PATENT DOCUMENTS

| | | | |
|---|---|---|---|
| 2016/0154528 A1* | 6/2016 | Ahn | G06F 3/046 |
| | | | 345/174 |
| 2016/0313812 A1 | 10/2016 | Katsurahira | |
| 2017/0003767 A1* | 1/2017 | Holsen | G06F 3/0443 |
| 2017/0108953 A1 | 4/2017 | Mao et al. | |

FOREIGN PATENT DOCUMENTS

| | | |
|---|---|---|
| JP | 8-194574 A | 7/1996 |
| JP | 2011-060261 A | 3/2011 |
| JP | 2011-186803 A | 9/2011 |
| JP | 2013-161307 A | 8/2013 |
| JP | 2014-056523 A | 3/2014 |
| JP | 2014-085308 A | 5/2014 |
| JP | 2014-206775 A | 10/2014 |
| JP | 2016-063331 A | 4/2016 |
| JP | 2016-184444 A | 10/2016 |
| KR | 2013-0090833 A | 8/2013 |
| KR | 2013-0116203 A | 10/2013 |
| WO | 2015/098486 A1 | 7/2015 |
| WO | 2016/158418 A1 | 10/2016 |

OTHER PUBLICATIONS

International Search Report for corresponding PCT/JP2018/000176, dated Feb. 27, 2018, 2 pages.
Japanese Office Action, dated Nov. 24, 2021, for Japanese Application No. 2018-115720, 9 pages. (with English Translation).
Korean Office Action, dated Nov. 23, 2021, for Korean Application No. 2019-7026503, 15 pages. (with English Translation).

* cited by examiner

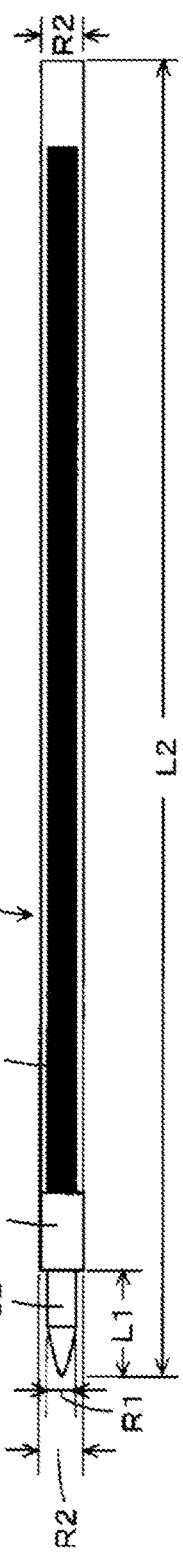
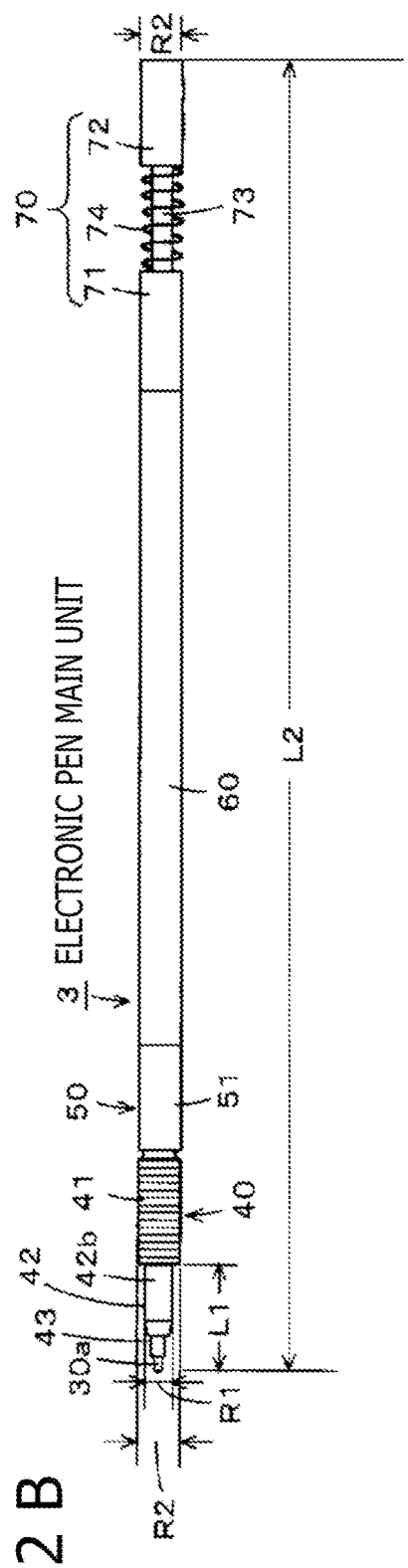
FIG. 2A
FIG. 2B

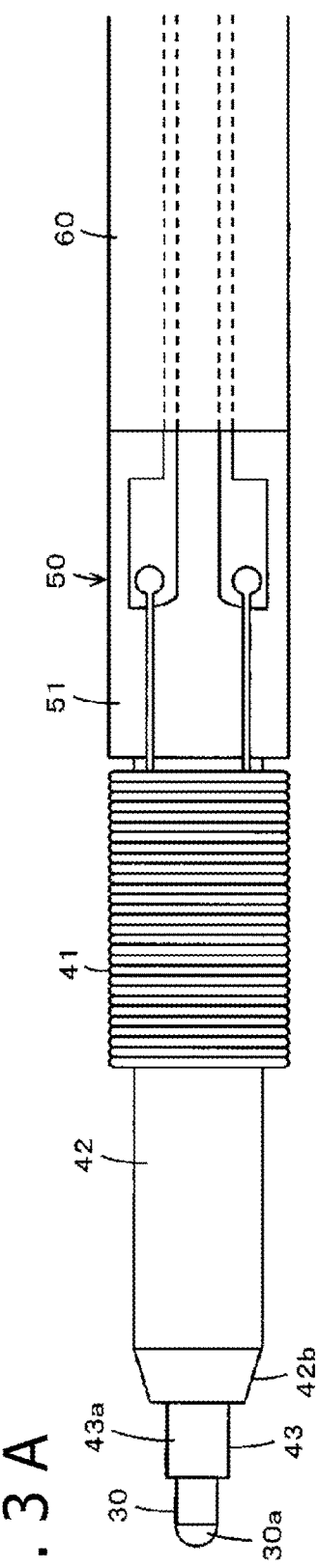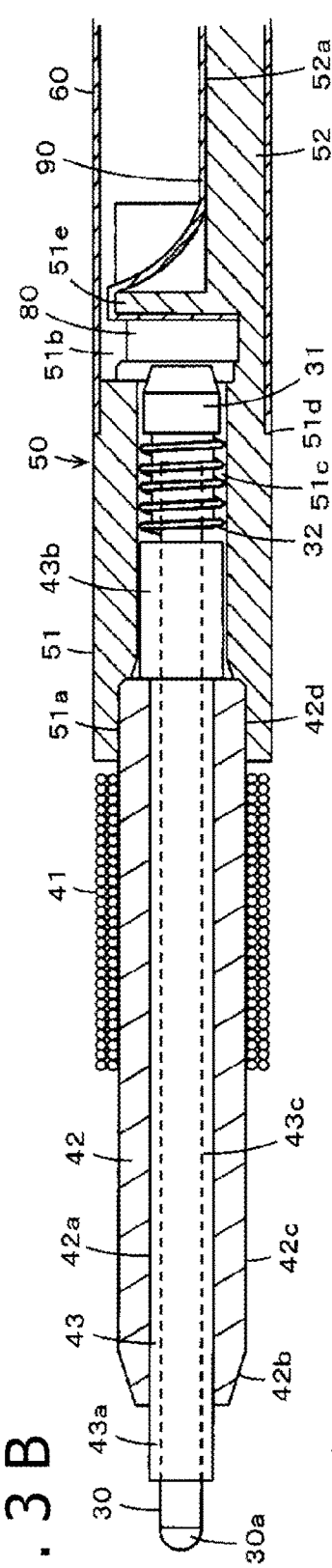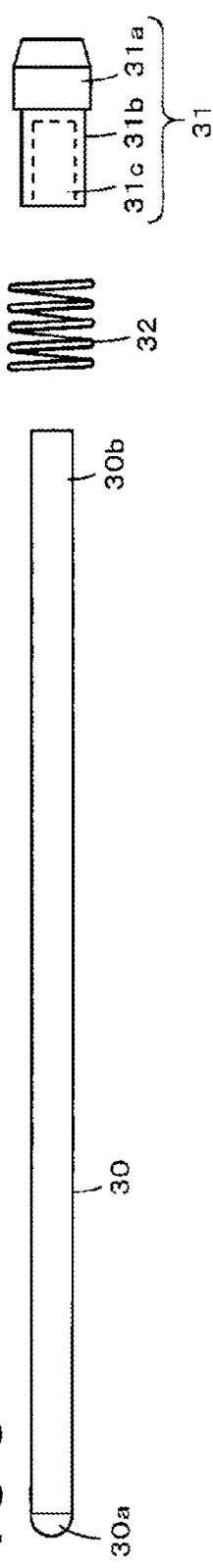

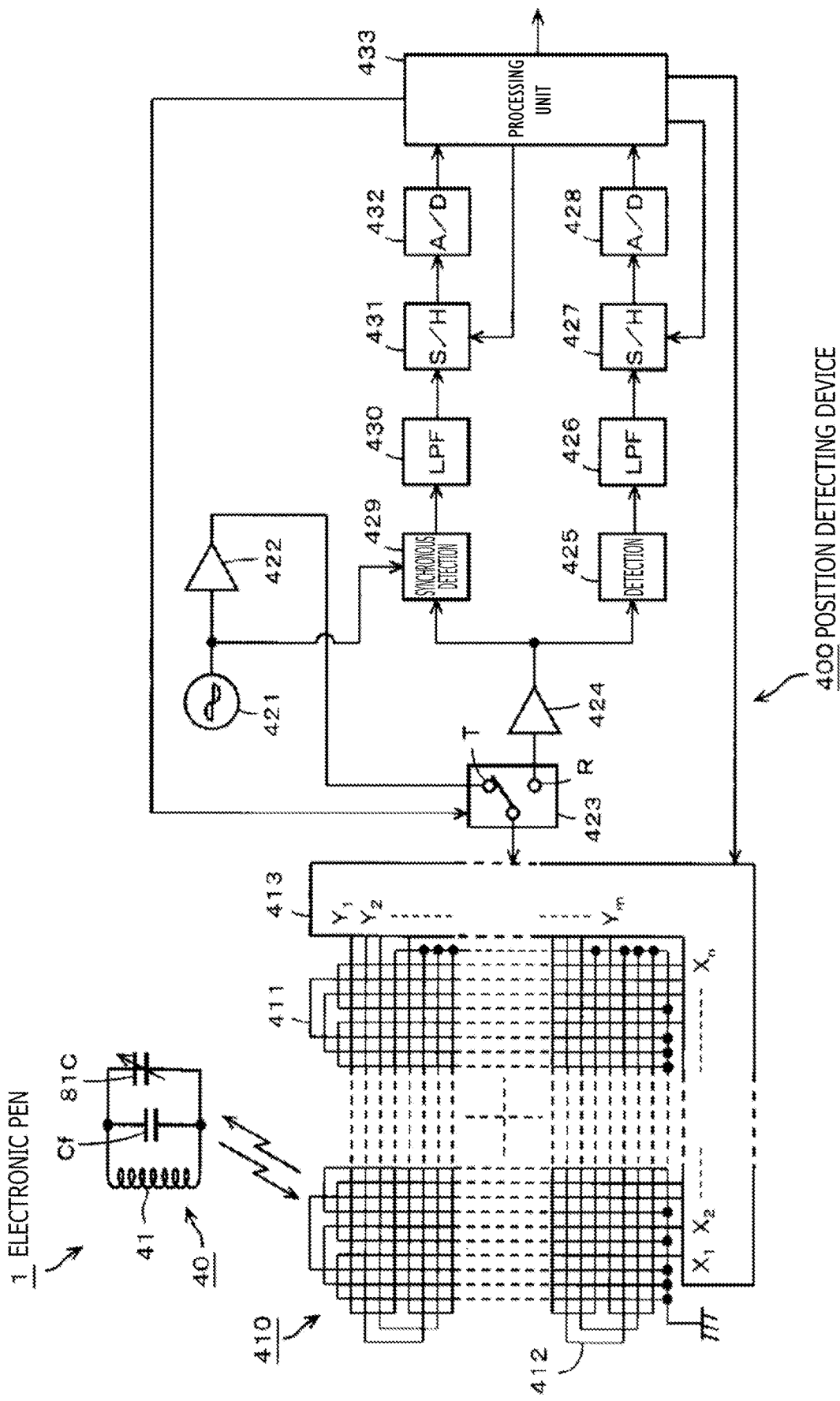

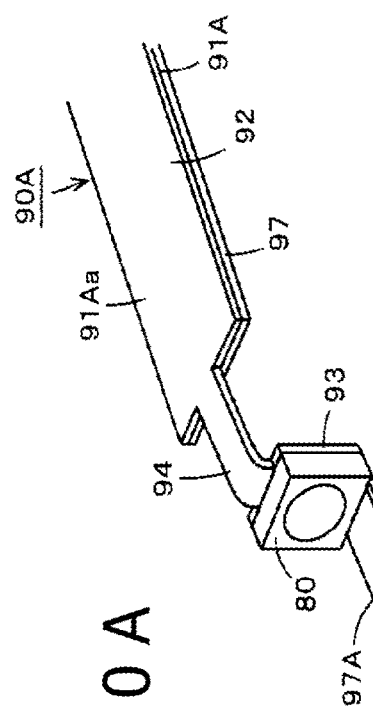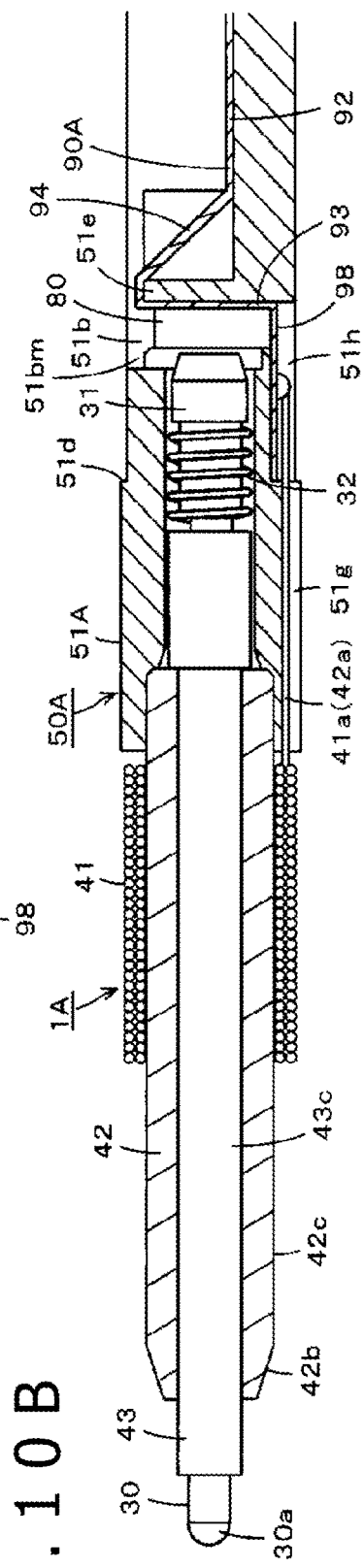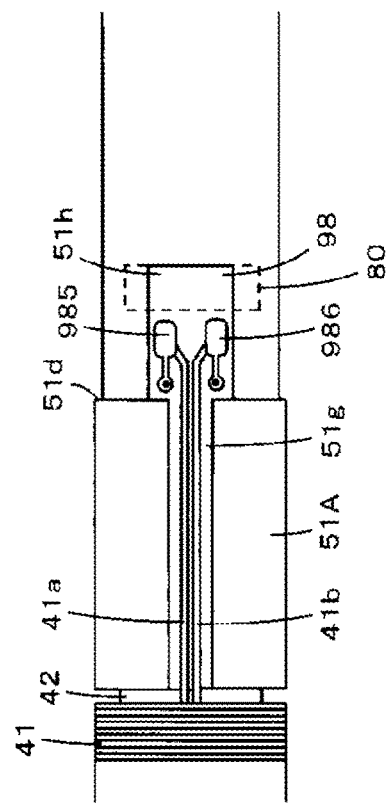

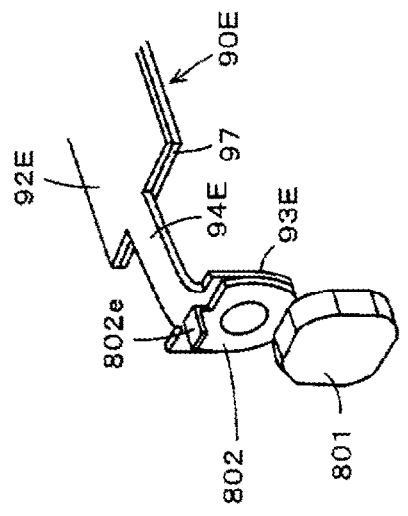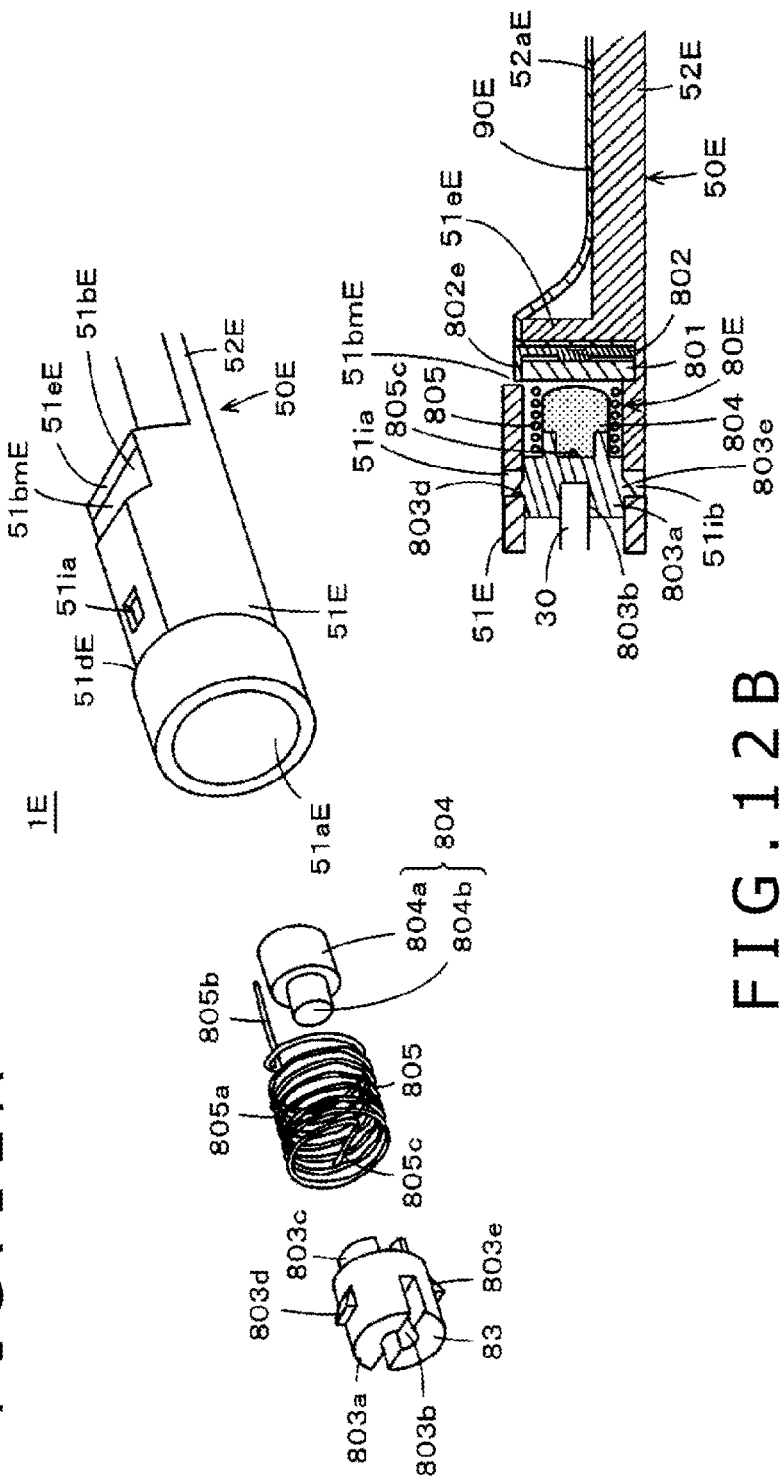
FIG. 12A
FIG. 12B

ELECTRONIC PEN

BACKGROUND

Technical Field

This disclosure relates to an electronic pen that is used with a position detecting device and has a writing pressure detection function for detecting a pressure (writing pressure) applied to a core body.

Description of the Related Art

Conventionally, the electronic pen is configured to have a function for detecting a pressure (writing pressure) applied to the tip part (pen tip) of a core body and transmitting the pressure to a position detecting device. In this case, a configuration of a writing pressure detecting unit using a mechanism that changes the capacitance of a capacitor according to the writing pressure as one example of a method for detecting the writing pressure is known (for example, refer to Patent Document 1 (Japanese Patent Laid-open No. 2011-186803)).

The writing pressure detecting unit described in this Patent Document 1 includes a dielectric and a first electrode and a second electrode that sandwich the dielectric and are opposed to each other, and is configured in such a manner that the contact area between one electrode of the two electrodes, for example, the first electrode, and the dielectric changes depending on the pressure applied to the core body. According to this configuration, the capacitance between the first electrode and the second electrode changes according to the contact area between the first electrode part and the dielectric, which changes according to the pressure applied to the core body. Therefore, the writing pressure can be detected by detecting the capacitance.

Conventionally, this writing pressure detecting unit is manufactured by inserting and disposing all of the plurality of components into a hollow part of a tubular holder from openings on one side and the other side in the axial center direction of this holder. For this reason, all of the plurality of components configuring the writing pressure detecting unit need to be inserted and disposed into the hollow part of the holder with consideration of position alignment in the axial center direction and in the direction orthogonal to the axial center direction regarding all of the plurality of components configuring the writing pressure detecting unit. However, there is a problem that it is difficult to carry out the position alignment in the axial center direction and in the direction orthogonal to the axial center direction. For this reason, there is a problem in that it is difficult and takes increased man-hours to manufacture the writing pressure detecting unit, making the writing pressure detecting unit unsuitable for mass production.

For example, an electronic pen in which this program is resolved is provided in Patent Document 2 (Japanese Patent Laid-open No. 2014-206775). In the electronic pen disclosed in this Patent Document 2, a printed board on which circuit elements for a writing pressure detecting circuit for detecting a pressing force applied to the tip of a core body are disposed is placed on a printed board placement part and is locked. In addition, the electronic pen includes a holder unit including a holding part for holding components for writing pressure detection. Furthermore, the holding part of the holder unit is formed into a tubular shape. In addition, the holding part has an opening oriented in a direction orthogonal to the axial center direction and has a configuration in which at least part of the components for writing pressure detection is inserted from the opening. The electronic pen of Patent Document 2 with this configuration can alleviate difficulty in work in the step of manufacturing the writing pressure detector and provides an effect of being suitable for mass production.

PRIOR ART DOCUMENT

Patent Documents

Patent Document 1: Japanese Patent Laid-open No. 2011-186803
Patent Document 2: Japanese Patent Laid-open No. 2014-206775

BRIEF SUMMARY

Technical Problems

However, also in the electronic pen of Patent Document 2, the first electrode and the second electrode of the writing pressure detecting unit and the circuit elements for the writing pressure detecting circuit of the printed board are electrically connected by soldering, for example, and this electrical connection is necessary as another step.

In view of the above points, the present disclosure provides an electronic pen that reduces manufacturing steps, including an electrical connection between a writing pressure detector and a writing pressure detecting circuit.

Technical Solution

At least one embodiment of the present disclosure is directed to an electronic pen including:

a tubular chassis;

a core body disposed on an end side of the tubular chassis in an axial center direction;

a writing pressure detector configured to detect a pressure applied to the core body;

a circuit board including a flexible substrate and a longitudinal length extending in the axial center direction, wherein the circuit board is in the tubular chassis, the circuit board comprising:

a writing pressure detector placement part, at least a portion of the writing pressure detector located on and coupled to the writing pressure detector part;

a circuit placement part, a predetermined circuit formed on the flexible substrate at the circuit placement part; and a line part arranged between the writing pressure detector placement part and the circuit placement part in the axial center direction, a conductive line pattern formed at the line part that electrically couples the writing pressure detector and the circuit of the circuit placement part; and a holder housed in the tubular chassis in such a manner as to hold the writing pressure detector and the circuit board and extend in the axial center direction, wherein the circuit placement part of the circuit board is held by the holder, and wherein the writing pressure detector placement part of the circuit board is configured in such a manner that, through bending of the flexible substrate at a part of the line part, the writing pressure detector placement part is held by the holder in a direction perpendicular to the axial center direction, and the writing pressure detector is allowed to receive a pressure in the axial center direction applied to the core body.

In the electronic pen with the above-described configuration, the flexible substrate is used for the circuit board. In addition, the circuit board includes the circuit placement part at which the predetermined circuit including a writing pressure detecting circuit, for example, is formed, the writing pressure detector placement part onto which at least part of components of the writing pressure detector is placed and fixed, and the line part at which the line pattern that electrically connects the circuit placement part and the writing pressure detector placement part is formed. Therefore, the state is obtained in which the electrical connection between the component placed and fixed onto the writing pressure detector placement part in the writing pressure detector and the circuit element of the circuit placement part is made on the circuit board in advance. For this reason, a work step of the electrical connection between the component placed and fixed onto the writing pressure detector placement part in the writing pressure detector and the circuit element of the circuit placement part becomes unnecessary.

BRIEF DESCRIPTION OF THE SEVERAL VIEWS OF THE DRAWINGS

FIGS. 2A and 2B depict diagrams for explaining one example of an electronic pen main body of the first embodiment of the electronic pen according to the present disclosure.

FIGS. 3A-3C depict partially enlarged views of the one example of the electronic pen main body of the first embodiment of the electronic pen according to the present disclosure.

FIG. 8 is a diagram for explaining an example of an electronic circuit of the first embodiment of the electronic pen according to the present disclosure and an electronic circuit example of a corresponding position detecting device.

FIGS. 10A-10C depict partially enlarged views of the one example of the electronic pen main body of the second embodiment of the electronic pen according to the present disclosure.

FIGS. 12A and 12B depict partially enlarged views of one example of an electronic pen main body of a third embodiment of the electronic pen according to the present disclosure.

DETAILED DESCRIPTION

Several embodiments of the electronic pan according to this disclosure will be described below with reference to the drawings.

First Embodiment

Figure 1A:
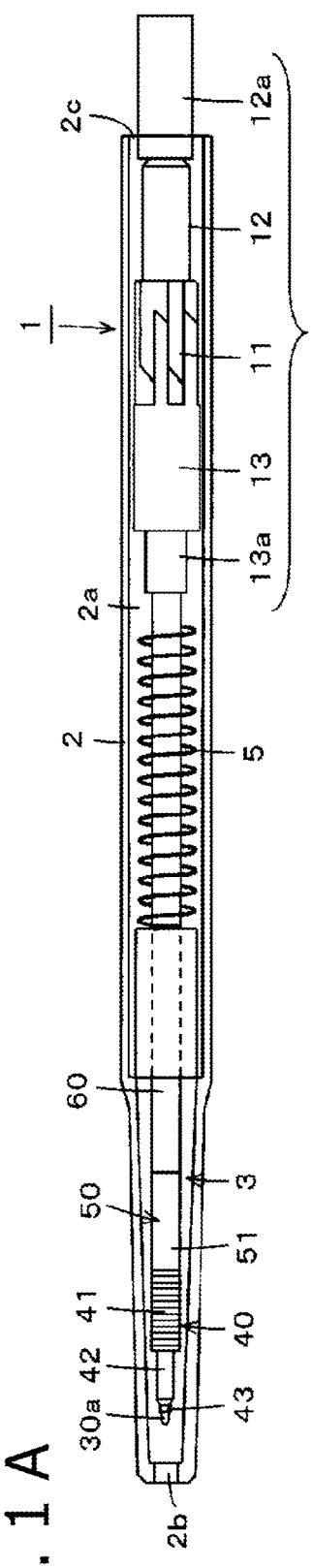
FIGS. 1A and 1B depict diagrams for explaining one example of a first embodiment of an electronic pen according to the present disclosure.
Figure 1B:
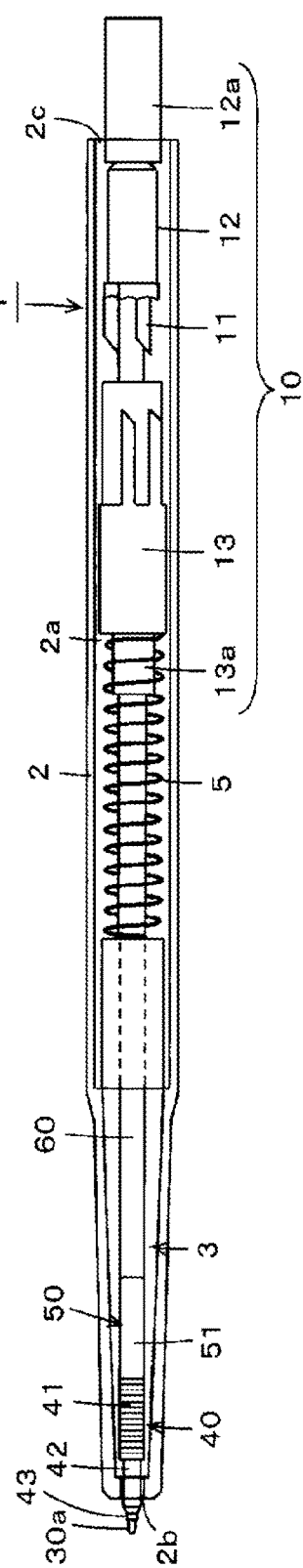

FIGS. 1A and 1B depict diagrams illustrating a configuration example of a first embodiment of the electronic pen according to this disclosure and this example is the case of an electronic pen of the electromagnetic induction system. An electronic pen 1 of this first embodiment has a knock-type configuration in which an electronic pen main body 3 is housed in a hollow part 2a of a tubular chassis 2 and the pen tip side of the electronic pen main body 3 is protruded and retracted from the side of an opening 2b at one end of the chassis 2 in the longitudinal direction by a knock cam mechanism 10. In this embodiment, the electronic pen main body 3 has a cartridge-type configuration and is allowed to be attached and detached to and from the chassis 2.

FIG. 1A illustrates the state in which the whole of the electronic pen main body 3 is housed in the hollow part 2a of the chassis 2. FIG. 1B illustrates the state in which the pen tip side of the electronic pen main body 3 protrudes from the opening 2b of the chassis 2 by the knock cam mechanism 10. The example of FIGS. 1A and 1B are illustrated as the state in which the chassis 2 of the electronic pen 1 is composed of a transparent synthetic resin and the inside thereof is see-through.

The electronic pen 1 of this embodiment is configured to ensure compatibility with a commercially-available knock-type ballpoint pen.

The chassis 2 and the knock cam mechanism 10 disposed in this chassis 2 have the same configuration as a well-known commercially-available knock-type ballpoint pen and are configured identically also regarding the dimensional relation. In other words, it is also possible to use the chassis and the knock cam mechanism of the commercially-available knock-type ballpoint pen as they are as the chassis 2 and the knock cam mechanism 10.

As illustrated in FIGS. 1A and 1B, the knock cam mechanism 10 has a well-known configuration in which a cam main body 11, a knock bar 12, and a rotary element 13 are combined. The cam main body 11 is formed on the inner wall surface of the tubular chassis 2. An end part 12a of the knock bar 12 is made to protrude from an opening 2c of the chassis 2 on the opposite side to the pen tip side such that knock operation by a user can be accepted. The rotary element 13 has a fitting part 13a to which the end part of the electronic pen main body 3 on the opposite side to the pen tip side is fitted.

When the end part 12a of the knock bar 12 is pressed down in the state of FIG. 1A, the electronic pen main body 3 is locked into the state of FIG. 1B in the chassis 2 by the knock cam mechanism 10, which provides the state in which the pen tip side of the electronic pen main body 3 protrudes from the opening 2b of the chassis 2. Then, when the end part 12a of the knock bar 12 is pressed down again from this state of FIG. 1B, the locked state is released by the knock cam mechanism 10 and the position of the electronic pen main body 3 in the chassis 2 returns to the state of FIG. 1A by a return spring 5. The detailed configuration of the knock cam mechanism 10 and the operation thereof are well known and therefore description thereof is omitted here.

Embodiment of Electronic Pen Main Body 3

FIGS. 2A and 2B depict diagrams illustrating a configuration example of the electronic pen main body 3 with comparison with a refill of a commercially-available knock-type ballpoint pen. Specifically, FIG. 2A illustrates a refill 6 of the commercially-available knock-type ballpoint pen and FIG. 2B illustrates the configuration example of the electronic pen main body 3 of this embodiment.

As illustrated in FIG. 2A, the refill 6 of the commercially-available knock-type ballpoint pen has a well-known configuration in which a pen tip part 6a in which a ball is disposed at the tip and an ink storage 6c are joined at a joint part 6b and are integrated. The joint part 6b has the same diameter as the ink storage 6c.

On the other hand, as illustrated in FIG. 2B, the electronic pen main body 3 of this embodiment is composed of a core body 30, a signal transmitter 40, a holder 50 that holds a writing pressure detector and holds a circuit board as described later, a cartridge chassis component 60 having a function of housing and protecting the writing pressure detector and the circuit board held by the holder 50, and a rear end component 70 disposed to be joined to the cartridge chassis component 60 on the opposite side to the core body side.

The core body 30 is a bar-shaped component composed of a resin material that is comparatively hard and has elasticity in this example, for example, polyoxymethylene (POM), and the diameter thereof is set to approximately 1 mm, for example.

The signal transmitter 40 is composed of a coil 41 forming a resonant circuit for transmitting and receiving a signal with a position detecting device by the electromagnetic induction system, a magnetic core around which this coil 41 is wound, a ferrite core 42 in this example, and a core pipe member 43 fitted and fixed into a penetration hole 42a of this ferrite core 42.

The holder 50 is composed of a resin material, for example, and holds the writing pressure detector. In addition, the holder 50 includes a tubular part 51 fitted to the ferrite core 42 of the signal transmitter 40 and includes a circuit board placement base part 52 (see FIG. 4 to be described later), for which diagrammatic representation is omitted in FIGS. 2A and 2B.

The cartridge chassis component 60 is formed of a component that is composed of a hard material and has a pipe shape, a component that is composed of a metal and has a pipe shape in this example, and forms a circuit part protecting component that protects an electrical circuit configuring part of the writing pressure detector and the circuit board.

The opposite side to the pen tip side in the axial center direction in the ferrite core 42 and the core pipe member 43 of the signal transmitter 40 is inserted and fitted into the tubular part 51 of the holder 50 and the signal transmitter 40 and the holder 50 are joined in the axial center direction.

Furthermore, the cartridge chassis component 60 and the holder 50 are joined in the axial center direction in the state in which the circuit board placement base part 52 and part of the tubular part 51 in the holder 50 are housed in a hollow part of the cartridge chassis component 60. Moreover, in the axial center direction, the rear end component 70 is joined to the opposite side to the side joined to the signal transmitter 40 in the cartridge chassis component 60. Through the joining of the signal transmitter 40, the holder 50, the cartridge chassis component 60, and the rear end component 70 in the axial center direction in the above-described manner, the electronic pen main body 3 is caused to have a configuration of a cartridge set identical to the refill 6 of a ballpoint pen as the outer shape.

In the rear end component 70, two bar-shaped members 71 and 72 divided in the axial center direction are joined to each other with the intermediary of a joining bar 73 in the state that the bar-shaped members 71 and 72 can move in such a manner as to come closer to each other in the axial center direction. Furthermore, a coil spring 74 is disposed between the two bar-shaped members 71 and 72 in such a manner as to house the joining bar 73 in the winding space thereof. Normally the two bar-shaped members 71 and 72 are elastically displaced to be separated from each other by this coil spring 74. The configuring part including the coil spring 74 in this rear end component 70 is a part that plays a role of a shock absorber (shock absorbing component) that absorbs a shock load (shock pressure) and protects the electronic pen main body 3 when the shock load is applied to the side of the core body 30 of the electronic pen main body 3. That is, when the shock load is applied in the axial center direction of the electronic pen main body 3, the coil spring 74 contracts corresponding to the shock load and works to absorb the shock. If the shock load disappears, the bar-shaped members 71 and 72 return to the original separated state due to the coil spring 74 of the rear end component 70.

FIG. 3A is a diagram illustrating the whole of the signal transmitter 40 and the joining part of this signal transmitter 40, the holder 50, and the cartridge chassis component 60 in an enlarged manner. Furthermore, FIG. 3B is a longitudinal sectional view of FIG. 3A. However, in FIG. 3B, the core pipe member 43 and the core body 30 are illustrated without being broken for convenience of explanation.

As the ferrite core 42 of this example, what is obtained by forming the penetration hole 42a (see FIG. 3B) in the axial center direction with a predetermined diameter for insertion of the core pipe member 43 in a ferrite material with a circular column shape, for example, is employed. A taper part 42b gradually tapered is formed on the pen tip side of this ferrite core 42. Due to this taper part 42b, the density of magnetic flux that passes through this ferrite core 42 becomes high density at the taper part 42b, and magnetic coupling with a sensor of the position detecting device can be made stronger compared with the case in which the taper part 42b does not exist.

Furthermore, in this embodiment, as illustrated in FIG. 3A, the coil 41 is not wound across the whole length of the ferrite core 42 in the axial center direction but wound partly. Specifically, in this example, the coil 41 is set to have the winding length approximately half the whole length of the ferrite core 42. In addition, as illustrated in FIG. 3A, the wound part of this coil 41 around the ferrite core 42 is set at a position biased to the part joined to the tubular part 51 of the holder 50 in the ferrite core 42.

Moreover, when the ferrite core 42 is viewed in the axial center direction thereof, the part from the end part thereof on the pen tip side to one end of the wound part of the coil 41 is set as a first non-coil-wound part 42c around which the coil 41 is not wound. Furthermore, the slight part from the other end of the wound part of the coil 41 to the side of the part joined to the tubular part 51 of the holder 50 is also set as a second non-coil-wound part 42d around which the coil 41 is not wound. The length of the second non-coil-wound part 42d in the axial center direction is set to a short length for joining to the tubular part 51 of the holder 50 (see FIG. 3B). On the other hand, in this example, the length of the first non-coil-wound part 42c in the axial center direction is set to a comparatively-long length obtained by subtracting the length of the second non-coil-wound part 42d from the length approximately half the whole length of the ferrite core 42.

The core pipe member 43 is formed of a metal in this example. As illustrated in FIG. 3B, the core pipe member 43 has an outer diameter slightly smaller than the diameter of the penetration hole 42a of the ferrite core 42. The core pipe member 43 is inserted in the penetration hole 42a of the ferrite core 42 and is attached through being joined and fixed to the ferrite core 42 by an adhesive, for example.

As illustrated in FIG. 3B, the core pipe member 43 is set longer than the length of the ferrite core 42 in the axial center direction. Thus, the core pipe member 43 includes protruding parts 43a and 43b that protrude to the pen tip side and the opposite side to the pen tip side relative to the penetration hole 42a of the ferrite core 42. In this example, as illustrated in FIG. 3B, the protruding part 43b of the core pipe member 43 on the opposite side to the pen tip side is set to have an outer diameter larger than the diameter of the penetration hole 42a of the ferrite core 42. By this protruding part 43b, the core pipe member 43 is kept from dropping off from the penetration hole 42a of the ferrite core 42 to the pen tip side.

Furthermore, the diameter of a penetration hole 43c (see dotted line part of the core pipe member 43 in FIG. 3B) of the core pipe member 43 is set slightly larger than the diameter of the core body 30, and the core body 30 is configured to be capable of being inserted movably in the axial center direction in this penetration hole 43c of the core pipe member 43. The length of the core body 30 is selected to be longer than the length of the core pipe member 43 as illustrated in FIG. 3C. In the case of this example, the length of the core body 30 is set to a length with which, as illustrated in FIG. 3B, one end part 30a (hereinafter, referred to as pen tip part 30a) of the core body 30 can protrude from the pen tip side of the ferrite core 42 and the core pipe member 43 as the pen tip and protrusion also to the opposite side to the pen tip side, of the ferrite core 42 and the core pipe member 43, is possible. The core pipe member 43 has functions of reinforcing the ferrite core 42 having the penetration hole 42a and protecting the core body 30 that protrudes to the pen tip side of the ferrite core 42 and is thin by the protruding part 43a protruding relative to the pen tip side of the ferrite core 42 such that the core body 30 may be kept from being broken.

Furthermore, as illustrated in FIG. 3B, the tubular part 51 of the holder 50 has a fitting recess 51a with almost the same diameter as the diameter of the second non-coil-wound part 42d of the ferrite core 42, a housing part 51b having a housing space in which a writing pressure detector 80 to be described in detail later is housed, and a penetration hole 51c that penetrates between the fitting recess 51a and the housing part 51b and has an inner diameter almost the same as the outer diameter of the protruding part 43b of the core pipe member 43 on the opposite side to the pen tip side.

Moreover, the ferrite core 42 is joined to the tubular part 51 of the holder 50 in the state in which the second non-coil-wound part 42d of the ferrite core 42 of the signal transmitter 40 is fitted into the fitting recess 51a and the protruding part 43b of the core pipe member 43 on the opposite side to the pen tip side is fitted into the penetration hole 51c. At this time, as illustrated in FIG. 3B, a pressure transmitting component 31 and a coil spring 32 illustrated in FIGS. 3B and 3C are disposed in the penetration hole 51c of the tubular part 51 prior to the joining to the ferrite core 42 and the core pipe member 43.

The pressure transmitting component 31 is a component for transmitting the pressure (writing pressure) applied to the pen tip part 30a of the core body 30 to a pressure receiving part of the writing pressure detector 80 and is formed of a component having elasticity, a resin having elasticity in this example. As illustrated in FIGS. 3B and 3C, the pressure transmitting component 31 of this example includes a pressing tip part 31a with a diameter slightly smaller than the diameter of the penetration hole 51c of the tubular part 51 and a columnar part 31b with a diameter smaller than the inner diameter of the coil spring 32. Furthermore, in the columnar part 31b, a fitting recess 31c (see dotted line part of the pressure transmitting component 31 in FIGS. 3B and 3C) into which an end part 30b of the core body 30 on the opposite side to the pen tip part 30a is fitted and locked is formed.

The length of the coil spring 32 in the axial center direction is selected to be slightly longer than the length of the columnar part 31b of the pressure transmitting component 31 in the axial center direction. Because the diameter of the columnar part 31b of the pressure transmitting component 31 is smaller than the inner diameter of the coil spring 32, the coil spring 32 becomes the state in which it is disposed around the columnar part 31b as illustrated in FIG. 3B.

Furthermore, in the state in which the ferrite core 42 and the core pipe member 43 of the signal transmitter 40 are fitted into the tubular part 51 of the holder 50, the coil spring 32 exists between the tip of the protruding part 43b of the core pipe member 43 on the opposite side to the pen tip side and the pressure receiving part of the writing pressure detector 80 in the penetration hole 51c of the tubular part 51 as illustrated in FIG. 3B. Therefore, due to elasticity of this coil spring 32, the pressure transmitting component 31 is set to the state in which it always abuts against the pressure receiving part of the writing pressure detector 80.

Moreover, after the ferrite core 42 and the core pipe member 43 of the signal transmitter 40 are fitted into the tubular part 51 of the holder 50, the core body 30 is caused to penetrate through the penetration hole 43c of the core pipe member 43 and the end part 30b thereof is fitted into the fitting recess 31c of the pressure transmitting component 31. The core body 30 can be released from the fitting to the pressure transmitting component 31 and be withdrawn by pulling the pen tip part 30a. Therefore, the core body 30 can be replaced.

When a space exists between the tip of the pressing tip part 31a of the pressure transmitting component 31 and the pressure receiving part of the writing pressure detector 80, in carrying out operation of pressing the electronic pen 1 against an input surface of the position detecting device to attempt writing, the pen tip part 30a retreats corresponding to the space although a writing pressure is not applied, and a sense of discomfort is given to the user. In contrast, in this embodiment, the pressure transmitting component 31 is set to the state in which it always abuts against the pressure receiving part of the writing pressure detector 80 due to elasticity of the coil spring 32, and the space is kept from being generated. For this reason, in carrying out operation of pressing the electronic pen 1 against the input surface of the position detecting device to attempt writing, the problem that the pen tip part 30a retreats corresponding to the space does not occur. Due to this, the writing pressure can be detected at the moment when the pen tip part 30a gets contact with the input surface of the sensor of the position detecting device, which provides the optimum feeling of writing for entry of characters.

In the electronic pen of this embodiment, as illustrated in FIG. 1B, when the pen tip part 30a of the core body 30 protrudes from the opening 2b of the chassis 2 of the electronic pen 1, part of the pen tip side of the first non-coil-wound part 42c of the ferrite core 42 and the protruding part 43a of the core pipe member 43 on the pen tip side also become the state of protruding from the opening 2b of the chassis 2.

Next, parts of the holder 50, the writing pressure detector 80 and a circuit board 90 held by this holder 50, and the cartridge chassis component 60 will be described by using FIGS. 4 to 7.

Figure 4:
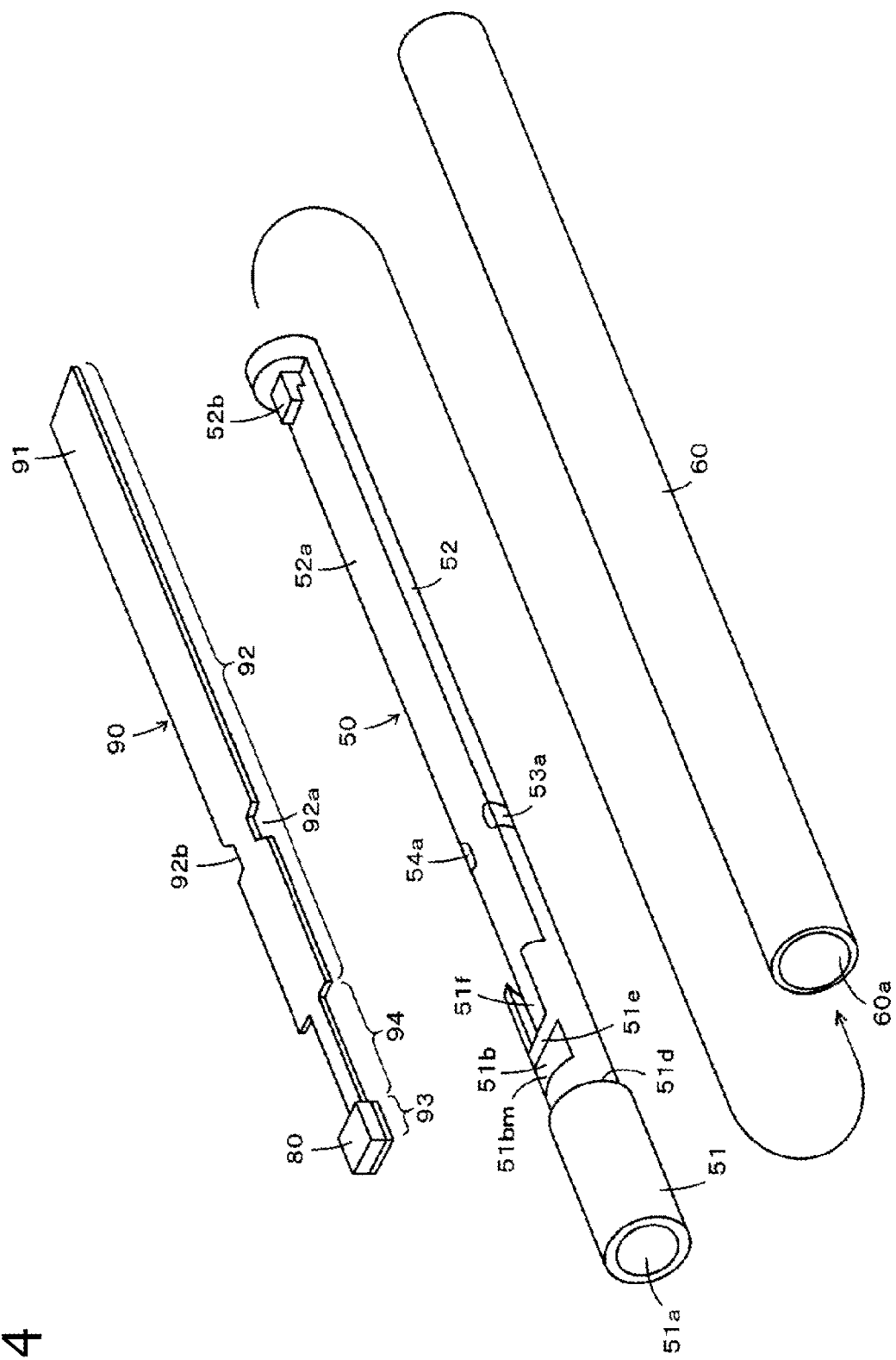
FIG. 4 is an exploded perspective view of part of the one example of the electronic pen main body of the first embodiment of the electronic pen according to the present disclosure.

FIG. 4 is an exploded perspective view illustrating the holder 50, the writing pressure detector 80 and the circuit board 90 held by this holder 50, and the cartridge chassis component 60 in a disassembled manner.

The holder 50 is a boat-shaped component that is elongated in the axial center direction and includes the above-described tubular part 51 on the pen tip side, and is composed of an insulating material, a resin in this example. In this holder 50, the circuit board placement base part 52 on which the circuit board 90 is placed is set monolithically with the tubular part 51. The circuit board placement base part 52 includes a flat surface part 52a obtained by cutting a circular column along a cut plane including the center line thereof. That is, the circuit board placement base part 52 is formed into a columnar shape whose section is a semicircle in this example.

Furthermore, the longitudinal direction of the flat surface part 52a of the circuit board placement base part 52 is the axial center direction of the tubular part 51 and the length (width) thereof in the short-side direction is set slightly shorter than the inner diameter of the cartridge chassis component 60. Therefore, the circuit board placement base part 52 is configured to be housed in the cartridge chassis component 60.

The outer diameter of the tubular part 51 of the holder 50 is set identical to the outer diameter of the cartridge chassis component 60 on the pen tip side, and the tubular part 51 is set to have the same outer diameter as the width of the flat surface part 52a of the circuit board placement base part 52 on the side of the circuit board placement base part 52. Thus, a step part 51d is formed at the position of the boundary between the parts different in the outer diameter. Therefore, when the holder 50 is inserted in the cartridge chassis component 60, the end surface of the cartridge chassis component 60 on the pen tip side abuts against the step part 51d and the holder 50 and the cartridge chassis component 60 are joined in the state. That is, in the cartridge chassis component 60, the circuit board placement base part 52 of the holder 50 and the part to the step part 51d on the side of the circuit board placement base part 52 in the tubular part 51 are housed. The outer diameter of the part on the pen tip side relative to the step part 51d in the tubular part 51 of the holder 50 is the same as the outer diameter of the cartridge chassis component 60. Therefore, in the state in which the holder 50 and the cartridge chassis component 60 are joined, the step part 51d disappears in appearance and the holder 50 and the cartridge chassis component 60 become one bar-shaped body.

Figure 5A:
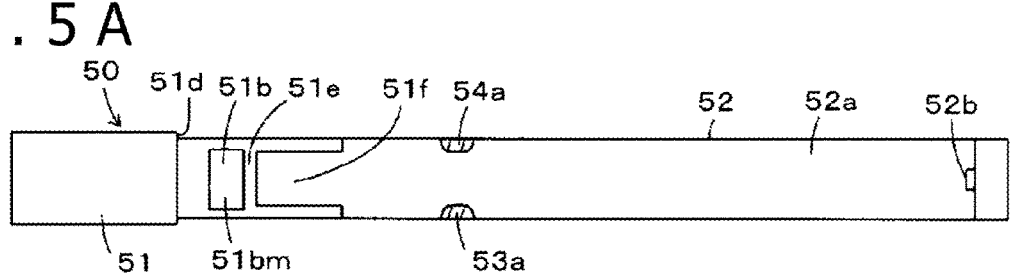
FIGS. 5A-5E depict diagrams for explaining an example of a circuit board and a holder unit in the one example of the electronic pen main body of the first embodiment of the electronic pen according to the present disclosure.
Figure 5B:
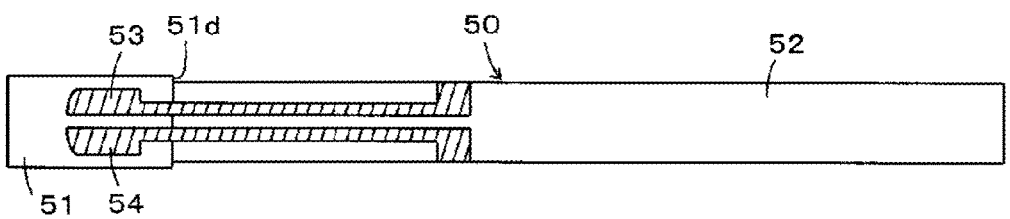

FIG. 5A is a diagram of the holder 50 when the flat surface part 52a of the circuit board placement base part 52 is viewed from directly above. Furthermore, FIG. 5B is a diagram when the holder 50 is viewed from the opposite side to the side of the flat surface part 52a of the circuit board placement base part 52.

As illustrated in FIG. 4 and FIG. 5A, the housing part 51b of the above-described writing pressure detector 80 is set at the part on the side of the circuit board placement base part 52 relative to the step part 51d in the tubular part 51 of the holder 50. The part on the side of the circuit board placement base part 52 relative to the step part 51d corresponding to the part of this housing part 51b is set as an opening part 51bm oriented in a direction orthogonal to the axial center direction, and the configuration is made in such a manner that the writing pressure detector 80 can be inserted into the housing part 51b from the direction orthogonal to the axial center direction through this opening part 51bm.

Furthermore, as illustrated in FIG. 4 and FIG. 5A, a wall part 51e having a wall surface orthogonal to the axial center direction is set on the side of the circuit board placement base part 52 with respect to the housing part 51b. This wall part 51e is formed of a plate-shaped body with a predetermined thickness. The housing part 51b is set to a size with which the writing pressure detector 80 to be described later can be housed without protrusion of the writing pressure detector 80 from this housing part 51b to the external.

In the part on the side of the circuit board placement base part 52 relative to the step part 51d in the tubular part 51 of the holder 50, a cut-out part 51f illustrated in FIG. 4 and FIG. 5A is formed at the part on the side of the circuit board placement base part 52 relative to the wall part 51e. Furthermore, as illustrated in FIG. 3B, FIG. 4, and FIG. 5A, in this example, a part extending to the part of the wall part 51e is formed into a flat surface shape continuously with the flat surface part 52a of the circuit board placement base part 52 in the tubular part 51 at the part of the cut-out part 51f. The width of the cut-out part 51f in a direction orthogonal to the axial center direction is selected to be wider than the width of a line part 94 of the circuit board 90 to be described later.

In the state in which the holder 50 is housed in the cartridge chassis component 60 and both are joined, the opening part 51bm of the housing part 51b and the cut-out part 51f are covered by the cartridge chassis component 60.

Furthermore, in this embodiment, on the surface (curved surface) of the holder 50 on the opposite side to the flat surface part 52a, as illustrated in FIG. 5B, two terminal members 53 and 54 (for facilitation of understanding, illustrated with slashes in FIGS. 5A and 5B) for connecting both ends of the coil 41 to the circuit board 90 are formed in the axial center direction of the electronic pen 1 from the pen tip side to an intermediate part of the circuit board placement base part 52 across the step part 51d as a three-dimensional micro-pattern using a molded interconnect device (MID) technique. As a result, the terminal members 53 and 54 become the state of being formed monolithically with the holder 50. As illustrated in FIG. 4 and FIG. 5A, the terminal members 53 and 54 are formed in such a manner that end parts 53a and 54a thereof appear also at the flat surface part 52a of the circuit board placement base part 52.

Moreover, the terminal members 53 and 54 are extended also to the pen tip side relative to the step part 51d in the tubular part 51 of the holder 50. Therefore, also when the cartridge chassis component 60 and the holder 50 are joined, the state in which the part extended also to the pen tip side relative to the step part 51d is exposed to the external is obtained. Both ends of the coil 41 are electrically connected to these terminal members 53 and 54 exposed to the external by being soldered, for example.

Figure 5C:
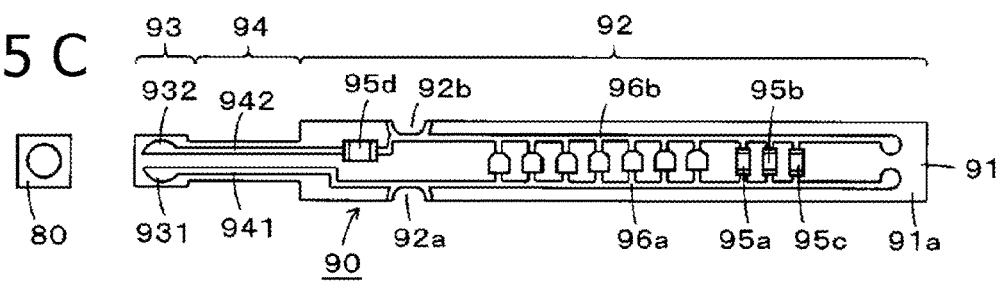
Figure 5D:
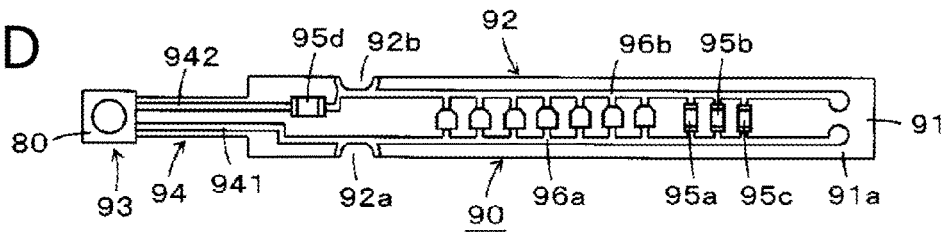
Figure 5E:
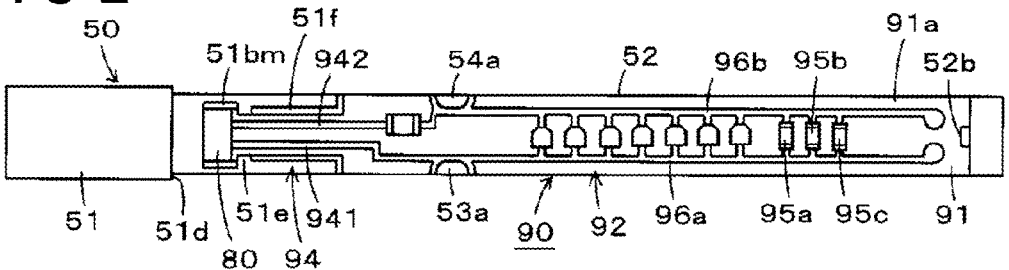

Next, the circuit board 90 will be described. FIG. 5C and FIG. 5D are diagrams when the circuit board 90 is viewed from the side of the surface on which a conductor pattern is formed. FIG. 5C illustrates the state before the writing pressure detector 80 is placed on the circuit board 90 and FIG. 5D illustrates the state in which the writing pressure detector 80 is placed on the circuit board 90 and is electrically connected to be fixed. Furthermore, FIG. 5E is a diagram illustrating the state in which the holder 50 is caused to hold the circuit board 90.

The circuit board 90 is configured with use of a flexible substrate 91 with an elongated shape. Along the longitudinal direction of the flexible substrate 91, the circuit board 90 is configured to, as illustrated in FIG. 4 and FIGS. 5C and 5D, include a circuit element for generating writing pressure information from detection output of the writing pressure detector 80 and include a circuit placement part 92 including circuit elements configuring a circuit (in this example, resonant circuit) for sending out a signal for position detection to the position detecting device, a writing pressure detector placement part 93 on which the writing pressure detector 80 is placed, and the line part 94 between the circuit placement part 92 and the writing pressure detector placement part 93.

The length of the part of the circuit placement part 92 of the flexible substrate 91 in the longitudinal direction is selected to be almost equal to the length of the flat surface part 52a of the circuit board placement base part 52 of the holder 50 in the longitudinal direction. Furthermore, the width thereof (length in a direction orthogonal to the longitudinal direction (hereinafter the same)) is set identical to the width of the circuit board placement base part 52 of the holder unit 50 in this example. However, the width of the part of the circuit placement part 92 may be smaller than the width of the circuit board placement base part 52.

The width of the part of the writing pressure detector placement part 93 of the flexible substrate 91 is set smaller than the width of the part of the circuit placement part 92 in this example. Furthermore, the length of the part of the writing pressure detector placement part 93 in the longitudinal direction of the flexible substrate 91 is set to a length with which the whole is housed in the housing part 51b. The part of the writing pressure detector placement part 93 of the flexible substrate 91 is formed into a square shape in conformity to the shape of the writing pressure detector 80 to be described later in this example. The size of the writing pressure detector placement part 93 may be the same as or slightly larger than the size of the writing pressure detector 80.

The length of the part of the line part 94 of the flexible substrate 91 in the longitudinal direction is selected to be slightly longer than the length of the cut-out part 51f of the tubular part 51 of the holder 50. Furthermore, the width of the part of the line part 94 of the flexible substrate 91 is selected to be smaller than the width of the writing pressure detector placement part 93 and be thinner than the width of the cut-out part 51f, and the configuration is made in such a manner that it becomes easier for the flexible substrate 91 to be folded at the part of this line part 94.

In the circuit placement part 92, on one surface (front surface) 91a of the flexible substrate 91, capacitors 95a, 95b, and 95c that are connected in parallel to the coil 41 of the signal transmitter 40 and form a resonant circuit are disposed as illustrated in FIGS. 5C and 5D. In addition, a conductor pattern for a circuit composed of conductor patterns 96a and 96b for forming the resonant circuit by connecting the coil 41 and these capacitors 95a, 95b, and 95c in parallel, and so forth, is disposed.

In the circuit placement part 92 of the flexible substrate 91, cut-out parts 92a and 92b are formed as illustrated in FIGS. 5C and 5D at parts corresponding to the end part 53a of the terminal member 53 and the end part 54a of the terminal member 54 when the circuit placement part 92 is placed on the flat surface part 52a of the circuit board placement base part 52 of the holder 50. Furthermore, the conductor patterns 96a and 96b are formed also at the parts of these cut-out parts 92a and 92b as illustrated in FIGS. 5C and 5D.

Therefore, as illustrated in FIG. 5E, when the circuit board 90 is placed on the circuit board placement base part 52 of the holder 50, the end part 53a of the terminal member 53 and the end part 54a of the terminal member 54 and the conductor patterns 96a and 96b are set to positions close to each other. Thus, electrical connection can be made more easily by soldering, for example, between the end part 53a of the terminal member 53 and the conductor pattern 96a and between the end part 54a of the terminal member 54 and the conductor pattern 96b.

At the line part 94, as illustrated in FIGS. 5C and 5D, line patterns (conductor patterns) 941 and 942 electrically connected to the conductor patterns 96a and 96b, respectively, of the circuit placement part 92 are formed between the circuit placement part 92 and the writing pressure detector placement part 93. Furthermore, at the writing pressure detector placement part 93, as illustrated in FIG. 5C, electrically-conductive pad patterns 931 and 932 electrically connected to the conductor patterns 96a and 96b, respectively, of the circuit placement part 92 through the line patterns 941 and 942 of the line part 94 are formed. The electrically-conductive pad patterns 931 and 932 are for electrical connection to the writing pressure detector 80.

In the example of FIGS. 5C and 5D, a capacitor 95d is connected between the conductor pattern 96b of the circuit placement part 92 and the line pattern 942 of the line part 94.

In the circuit board 90 of this example, only on one surface side (front surface side) of the flexible substrate 91, the necessary conductor pattern is formed and the circuit elements connected through the conductor pattern are disposed. Furthermore, in this example, a double-sided tape (diagrammatic representation is omitted in FIG. 5) is stuck to the other surface side (back surface side) of the circuit placement part 92 of the flexible substrate 91 of the circuit board 90. In this example, the double-sided tape is not stuck to the back surface side of the writing pressure detector placement part 93 and the line part 94 of the flexible substrate 91. However, the double-sided tape may be stuck thereto.

In this example, the writing pressure detector 80 is formed of a single component configured as a package with use of a microelectromechanical system (MEMS) element that detects the pressure applied to the core body as change in the capacitance.

Figure 6A:
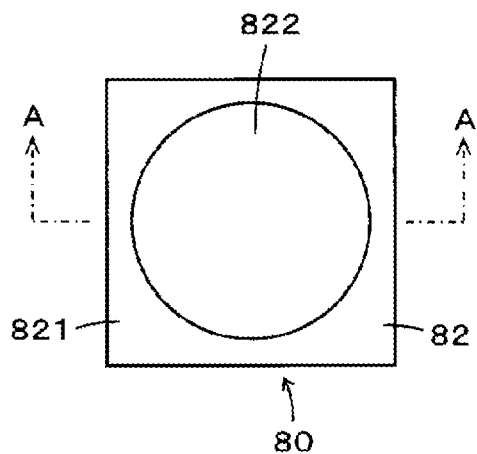
FIGS. 6A and 6B depict diagrams for explaining an example of a writing pressure detector in the one example of the electronic pen main body of the first embodiment of the electronic pen according to the present disclosure.
Figure 6B:
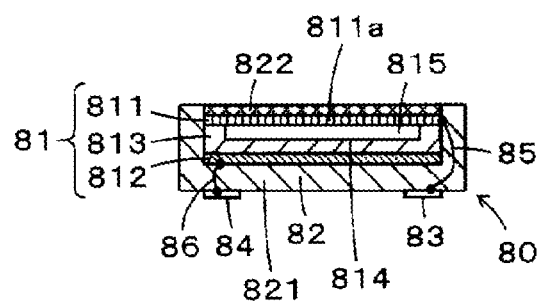

FIGS. 6A and 6B depict diagrams for explaining the configuration of the writing pressure detector 80 of this example. FIG. 6A is a plan view as viewed from the side of the pressure receiving part thereof. FIG. 6B is a sectional view along line A-A in FIG. 6A.

The writing pressure detector 80 of this example is what is obtained by sealing a pressure sensing chip 81 configured as a semiconductor device fabricated by a MEMS technique in a package 82 with a rectangular parallelepiped box shape, for example.

The pressure sensing chip 81 detects the applied pressure as change in the capacitance. The pressure sensing chip 81 of this example is formed into a rectangular parallelepiped shape of depth×width×height=L1×L1×H1. For example, L1=1.5 mm and H1=0.5 mm are set.

The pressure sensing chip 81 of this example is composed of a first electrode 811, a second electrode 812, and an insulating layer (dielectric layer) 813 between the first electrode 811 and the second electrode 812. The first electrode 811 and the second electrode 812 are formed of a conductor composed of single-crystal silicon (Si) in this example. The insulating layer 813 is formed of an oxide film (SiO$_2$) in this example.

Furthermore, on the side of the surface of this insulating layer 813 opposed to the first electrode 811, a circular recess 814 centered at the central position of this surface is formed in this example. A space 815 is formed between the insulating layer 813 and the first electrode 811 due to this recess 814. In this example, the bottom surface of the recess 814 is formed as a flat surface and a radius R thereof is set to R=1 mm, for example. Moreover, the depth of the recess 814 is set to several tens of microns to approximately one hundred microns in this example.

Due to the existence of this space 815, the first electrode 811 can be displaced to bend in the direction of this space 815 when being pressed from the side of a surface 811a on the opposite side to the surface opposed to the second electrode 812. The thickness of the single-crystal silicon as an example of the first electrode 811 is set to a thickness that allows bending by the applied pressure and is set thinner than the second electrode 812.

In the pressure sensing chip 81 with the above configuration, a capacitor 81C is formed between the first electrode 811 and the second electrode 812. Furthermore, when a pressure is applied to the first electrode 811 from the side of the surface 811a of the first electrode 811 on the opposite side to the surface opposed to the second electrode 812, the first electrode 811 bends and the distance between the first electrode 811 and the second electrode 812 becomes shorter, so that the value of the capacitance of the capacitor 81C changes to become large. The amount of bending of the first electrode 811 changes according to the magnitude of the applied pressure. Therefore, the capacitor 81C is a variable-capacitance capacitor according to the magnitude of the pressure applied to the pressure sensing chip 81.

In the writing pressure detector 80 of this embodiment, the pressure sensing chip 81 having the above configuration is housed in the package 82 in the state in which the surface 811a of the first electrode 811 that receives a pressure serves as the pressure receiving side.

In this example, the package 82 is composed of a package member 821 composed of an electrically-insulating material such as a ceramic material or resin material and an elastic member 822 disposed on the side of the surface 811a that receives the pressure of the pressure sensing chip 81 in this package member 821.

The package 82 of this example is formed into a rectangular parallelepiped shape of depth×width×height=L2×L2×H2. For example, L2=1.9 mm and H2=1.0 mm are set.

Furthermore, as illustrated in FIG. 6B, to the bottom surface of the package member 821 of the writing pressure detector 80 on the opposite side to the pressure receiving side, a first lead terminal 83 connected to the first electrode 811 of the pressure sensing chip 81 is led out and a second lead terminal 84 connected to the second electrode 812 of the pressure sensing chip 81 is led out. The first lead terminal 83 is electrically connected to the first electrode 811 by a gold wire 85, for example. Furthermore, the second lead terminal 84 is electrically connected to the second electrode 812 by a gold wire 86, for example.

The writing pressure detector 80 is placed on the writing pressure detector placement part 93 of the circuit board 90 and is fixed onto the writing pressure detector placement part 93 as illustrated in FIG. 5D in such a manner that the first lead terminal 83 and the second lead terminal 84 are electrically connected to the electrically-conductive pad patterns 931 and 932, respectively, formed on the writing pressure detector placement part 93 of the circuit board 90.

In this manner, the circuit board 90 on which the writing pressure detector 80 is placed on the writing pressure detector placement part 93 and is electrically connected and fixed becomes the state in which the capacitor forming the resonant circuit with the coil 41 and the capacitor formed of the writing pressure detector 80 are connected in parallel.

The circuit board 90 with the above configuration is manufactured as follows. Specifically, first, a plurality of parts having the configuration of the above-described circuit board 90 in which the necessary conductor pattern like the above-described one is formed at the circuit placement part 92, the writing pressure detector placement part 93, and the line part 94 are formed on a flexible substrate with a predetermined size. At this time, each of the parts having the configuration of the above-described circuit board 90 is formed in such a manner that the plurality of parts are lined up with the intermediary of a gap with which later separation is possible.

Next, in each of the constituent parts of the plurality of circuit board 90, for the circuit placement part 92, solder paste for connection between the formed conductor pattern and the necessary electronic components is applied and the necessary electronic components are placed through position alignment. In addition, solder paste is applied to the respective electrically-conductive pad patterns 931 and 932 of the writing pressure detector placement part 93 and the writing pressure detector 80 is placed through position alignment between the first lead terminal 83 and the second lead terminal 84 thereof and the electrically-conductive pad patterns 931 and 932.

Next, the flexible substrate on which the writing pressure detectors 80 are placed on these writing pressure detector placement parts 93 is loaded into a solder reflow apparatus and the solder paste on the flexible substrate is melted to make electrical connection between the electronic components of the circuit placement part 92 and the conductor pattern and make electrical connection between the electrically-conductive pad patterns 931 and 932 of the writing pressure detector placement part 93 and the first lead terminal 83 and the second lead terminal 84 of the writing pressure detector 80. Thereby, the necessary electronic components are fastened to the circuit placement part 92 and the writing pressure detector 80 is fastened to the writing pressure detector placement part 93.

Next, the flexible substrate is cut in such a manner that the parts of the plurality of circuit boards 90 are separated from each other and each of the circuit boards 90 with the above-described configuration is completed.

Figure 7:
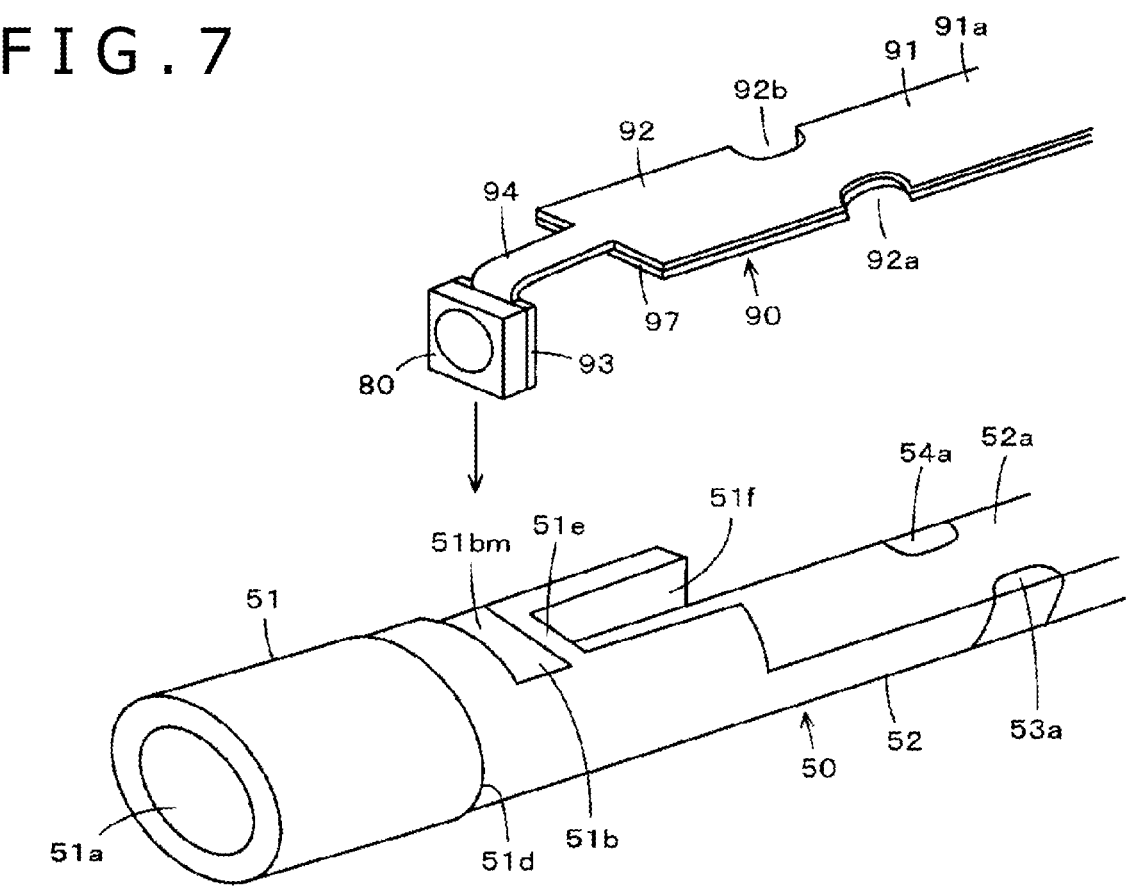
FIG. 7 is a diagram for explaining the one example of the electronic pen main body of the first embodiment of the electronic pen according to the present disclosure.

For the circuit board 90 manufactured in the above-described manner, as illustrated in FIG. 7, the part of the writing pressure detector placement part 93 on which the writing pressure detector 80 is placed and is electrically connected and fixed is let in and inserted into the housing part 51*b* and housed through the opening part 51*bm* of the tubular part 51 of the holder 50 from the direction that is orthogonal to the axial center direction and is orthogonal to the flat surface part 52*a* of the circuit board placement base part 52 of the holder 50. Then, as illustrated in FIG. 7 and FIG. 5D, the circuit board 90 is folded at the place of the line part 94 and the part of the circuit placement part 92 is pressed against the side of the flat surface part 52*a* of the circuit board placement base part 52. At this time, the line part 94 can be located on the side of the flat surface part 52*a* of the circuit board placement base part 52 through the cut-out part 51*f* of the holder 50 (see FIG. 3B and FIG. 5D).

Then, as illustrated in FIG. 7, by a double-sided tape 97 disposed on the back surface side of the flexible substrate 91 of the circuit board 90, the writing pressure detector placement part 93 is boned and fixed to the surface of the wall part 51*e* on the side of the housing part 51*b* and the circuit placement part 92 is bonded and fixed onto the flat surface part 52*a* of the circuit board placement base part 52 of the holder 50. A protrusion 52*b* for clamping and locking an end part of the circuit board 90 in the longitudinal direction is formed on the rear end side of the circuit board placement base part 52. The circuit board 90 is disposed on the flat surface part 52*a* of the circuit board placement base part 52 in such a manner that the end part is clamped between this protrusion 52*b* and the flat surface part 52*a* of the circuit board placement base part 52.

In the example of FIG. 3B, the line part 94 is set to the state in which it exists in the air. However, needless to say, this line part 94 may also be bonded and fixed to the surface of the wall part 51*e* on the opposite side to the side of the housing part 51*b* and an extended flat surface of the circuit placement part 92 by a double-sided tape.

After the circuit board 90 is held by the holder 50 in the above-described manner, the holder 50 is housed into the cartridge chassis component 60 from the opposite side to the tubular part 51 and the state is made in which the end surface of the cartridge chassis component 60 abuts against the step part 51*d* of the tubular part 51 of the holder 50 as described above. Thereby, the holder 50 is joined to the cartridge chassis component 60 in the state in which the cut-out part 51*f* and the opening part 51*bm* of the housing part 51*b* in the tubular part 51 of the holder 50 are covered by the cartridge chassis component 60.

Thereafter, the pressure transmitting component 31 around which the coil spring 32 is wound is inserted into the penetration hole 51*c* of the tubular part 51 of the holder 50. Then, the ferrite core 42 and the core pipe member 43 of the signal transmitter 40 are inserted and fitted into the tubular part 51 of the holder 50 and the signal transmitter 40 is joined to the holder 50. Then, one end and the other end of the coil 41 wound around the ferrite core 42 of the signal transmitter 40 are electrically connected to the terminal members 53 and 54 formed on the tubular part 51 of the holder 50 by soldering or the like, for example.

Thereafter, the core body 30 is inserted in the penetration hole 43*c* of the core pipe member 43 and the end part 30*b* of the core body 30 is inserted and fitted into the fitting recess 31*c* of the pressure transmitting component 31. Through the above, the electronic pen main body 3 is completed.

In the above-described manner, in this embodiment, the circuit board 90 includes the writing pressure detector placement part 93 and the writing pressure detector 80 is placed on the writing pressure detector placement part 93 in advance and is fixed in the state of being electrically connected to a circuit element of the circuit placement part 92 of the circuit board 90. Therefore, the electrical connection between the writing pressure detector 80 and the circuit placement part 92 has already ended at a stage before the holder 50 is caused to hold the circuit board 90. For this reason, a step of connecting the writing pressure detector and the circuit board by soldering or the like after the holder 50 is caused to hold the circuit board 90 as in the conventional technique becomes unnecessary Circuit Configuration for Position Detection and Writing Pressure Detection in Position Detecting Device Used with Electronic Pen 1

Next, with reference to FIG. 8, a description will be made regarding a circuit configuration example of a position detecting device 400 that carries out detection of the position indicated by the electronic pen 1 of the above-described embodiment and detection of the writing pressure applied to the electronic pen 1 and the operation of the position detecting device 400.

As illustrated in FIG. 8, the electronic pen 1 includes a resonant circuit in which the coil 41 as an inductance element, the variable-capacitance capacitor 81C formed of the pressure sensing chip 81 of the writing pressure detector 80, and a capacitor Cf for resonance disposed at the circuit placement part 92 of the circuit board 90 are connected in parallel. The capacitor Cf is illustrated as what is obtained by combining the capacitors 95*a*, 95*b*, and 95*c* disposed at the circuit placement part 92 of the circuit board 90. Furthermore, it is assumed that the capacitor 95*d* of the circuit placement part 92 of the circuit board 90 is included in the variable-capacitance capacitor 81C for convenience of description.

Meanwhile, in the position detecting device 400, an X-axis direction loop coil group 411 and a Y-axis direction loop coil group 412 are stacked and a position detecting coil 410 is formed. The respective loop coil groups 411 and 412 are composed of n and m, respectively, rectangular loop coils, for example. The respective loop coils configuring the respective loop coil groups 411 and 412 are disposed to be lined up at equal intervals and sequentially overlap with each other.

Furthermore, in the position detecting device 400, a selection circuit 413 to which the X-axis direction loop coil group 411 and the Y-axis direction loop coil group 412 are connected is disposed. This selection circuit 413 sequentially selects one loop coil in the two loop coil groups 411 and 412.

Moreover, the position detecting device 400 is provided with an oscillator 421, a current driver 422, a switching connecting circuit 423, a receiving amplifier 424, a detector 425, a low-pass filter 426, a sample/hold circuit 427, an analog to digital (A/D) conversion circuit 428, a synchronous detector 429, a low-pass filter 430, a sample/hold circuit 431, an A/D conversion circuit 432, and a central processing unit (CPU) 433. The central processing unit 433 is formed of a microprocessor.

The oscillator 421 generates an AC signal with a frequency f0. Furthermore, the oscillator 421 supplies the generated AC signal to the current driver 422 and the synchronous detector 429. The current driver 422 converts the AC signal supplied from the oscillator 421 to a current and sends out the current to the switching connecting circuit 423. Based on control from the central processing unit 433, the switching connecting circuit 423 switches the connection target (transmitting-side terminal T, receiving-side terminal R) to which the loop coil selected by the selection circuit 413 is connected. In these connection targets, the transmitting-side terminal T and the receiving-side terminal R are connected to the current driver 422 and the receiving amplifier 424, respectively.

An induced voltage generated in the loop coil selected by the selection circuit 413 is sent to the receiving amplifier 424 via the selection circuit 413 and the switching connecting circuit 423. The receiving amplifier 424 amplifies the induced voltage supplied from the loop coil and sends out the amplified voltage to the detector 425 and the synchronous detector 429.

The detector 425 detects the induced voltage generated in the loop coil, i.e., the received signal, and sends out the received signal to the low-pass filter 426. The low-pass filter 426 has a cutoff frequency sufficiently lower than the above-described frequency f0 and converts the output signal of the detector 425 to a DC signal to send out the DC signal to the sample/hold circuit 427. The sample/hold circuit 427 holds a voltage value at predetermined timing of the output signal of the low-pass filter 426, specifically at predetermined timing in the reception period, and sends out the voltage value to the A/D conversion circuit 428. The A/D conversion circuit 428 converts the analog output of the sample/hold circuit 427 to a digital signal and outputs the digital signal to the central processing unit 433.

Meanwhile, the synchronous detector 429 carries out synchronous detection of the output signal of the receiving amplifier 424 with the AC signal from the oscillator 421 and sends out a signal at a level according to the phase difference between them to the low-pass filter 430. This low-pass filter 430 has a cutoff frequency sufficiently lower than the frequency f0 and converts the output signal of the synchronous detector 429 to a DC signal to send out the DC signal to the sample/hold circuit 431. This sample/hold circuit 431 holds a voltage value at predetermined timing of the output signal of the low-pass filter 430 and sends out the voltage value to the A/D conversion circuit 432. The A/D conversion circuit 432 converts the analog output of the sample/hold circuit 431 to a digital signal and outputs the digital signal to the central processing unit 433.

The central processing unit 433 controls the respective units of the position detecting device 400. Specifically, the central processing unit 433 controls selection of the loop coil in the selection circuit 413, switching by the switching connecting circuit 423, and the timing of the sample/hold circuits 427 and 431. The central processing unit 433 causes radio waves to be transmitted from the X-axis direction loop coil group 411 and the Y-axis direction loop coil group 412 with a certain transmission continuation time (continuous transmission section) based on input signals from the A/D conversion circuits 428 and 432.

In each loop coil of the X-axis direction loop coil group 411 and the Y-axis direction loop coil group 412, an induced voltage is generated by radio waves transmitted (returned) from the electronic pen 1. The central processing unit 433 calculates the coordinate value of the position indicated by the electronic pen 1 in the X-axis direction and the Y-axis direction based on the level of the voltage value of this induced voltage generated in each loop coil. Furthermore, the central processing unit 433 detects the writing pressure based on the level of a signal according to the phase difference between transmitted radio waves and received radio waves.

In this manner, the position of the electronic pen 1 that approaches is detected by the central processing unit 433 in the position detecting device 400. Furthermore, information on the writing pressure value of the electronic pen 1 is obtained by detecting the phase of a received signal.

Effects of First Embodiment

In the electronic pen 1 of the above-described embodiment, the circuit board 90 obtained by forming the circuit placement part 92, the writing pressure detector placement part 93, and the line part 94 between the circuit placement part 92 and the writing pressure detector placement part 93 on the flexible substrate 91 in the longitudinal direction thereof is used, and the writing pressure detector 80 is placed on the writing pressure detector placement part 93 in advance and is fixed in the state of being electrically connected to a circuit element of the circuit placement part 92 through the line part 94. Therefore, the electrical connection between the writing pressure detector 80 and the circuit placement part 92 has already ended at a stage before the holder unit 50 is caused to hold the circuit board 90, and a step of soldering processing for electrically connecting the writing pressure detector 80 and the circuit element of the circuit placement part 92 can be reduced.

Furthermore, the circuit board 90 is formed of the flexible substrate 91 and can be bent at the part of the line part 94. This provides an effect that the writing pressure detector 80 can be housed in the housing part 51*b* of the tubular part 51 of the holder unit 50, with the pressure receiving surface of the writing pressure detector 80 along the direction orthogonal to the axial center direction, such that the pressure applied to the core body 30 can be received.

Moreover, because the pressure sensing chip 81 is disposed as one component housed in the package 82, there is also an effect that the writing pressure detector 80 can be attached by only placing the writing pressure detector 80 on the writing pressure detector placement part 93 of the circuit board 90 and fixing the terminal members of the pressure sensing chip 81 in the state in which the terminal members are electrically connected to the electrically-conductive pad patterns of the writing pressure detector placement part 93.

Furthermore, the terminal members 53 and 54 for electrical connection between both ends of the coil 41 and the circuit elements of the circuit placement part 92 are formed on the holder unit 50. Therefore, there is an effect that the electrical connection between both ends of the coil 41 and the circuit elements of the circuit placement part 92 is allowed at the holder unit 50 and connection work becomes easy.

Second Embodiment

In the electronic pen 1 of the above-described first embodiment, the terminal members 53 and 54 are formed on the tubular part 51 of the holder unit 50 as a three-dimensional micro-pattern for connection between the coil 41 and circuit elements of the circuit placement part 92 of the circuit board 90. However, the connection between the coil 41 and the circuit elements of the circuit placement part 92 of the circuit board 90 is not limited to such a form. In an electronic pen of a second embodiment, the configuration is made in such a manner that a circuit board 90 and both ends of the coil 41 can be directly connected by slightly changing the configuration of the holder unit 50 and the circuit board 90 of the electronic pen main body 3 in the first embodiment.

FIGS. 9A-9D depict diagrams illustrating a holder 50A and a circuit board 90A that configure the major part of the electronic pen of this second embodiment and the other part of the electronic pen of the second embodiment is configured similarly to the first embodiment. In the holder 50A and the circuit board 90A of the example of FIGS. 9A-9D, the same part as the holder 50 and the circuit board 90 of the electronic pen 1 of the above-described first embodiment is given the same reference numeral and detailed description thereof is omitted.

Figure 9A:
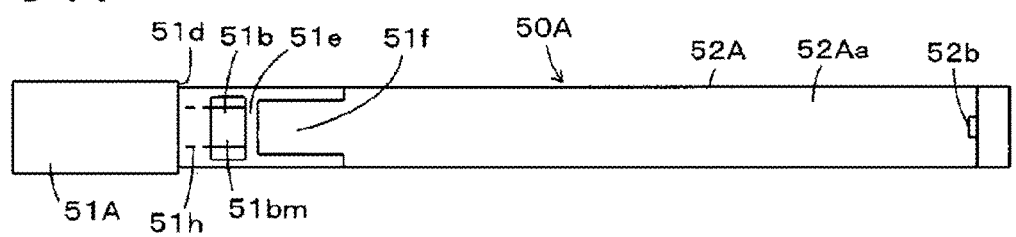
FIGS. 9A-9D depict diagrams for explaining an example of a circuit board and a holder unit in one example of an electronic pen main body of a second embodiment of the electronic pen according to the present disclosure.
Figure 9B:
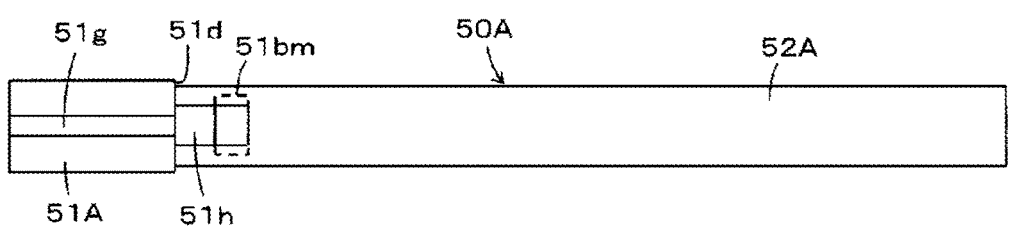
Figure 9C:
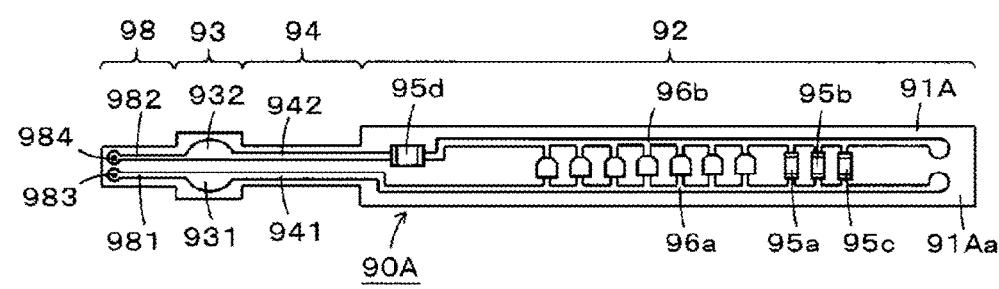
Figure 9D:
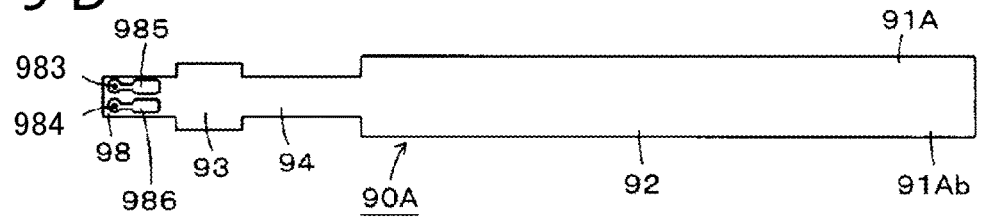

FIG. 9A is a diagram of the holder 50A when a flat surface part 52Aa of a circuit board placement base part 52A is viewed from directly above. Furthermore, FIG. 9B is a diagram when the holder 50A is viewed from the opposite side to the side of the flat surface part 52Aa of the circuit board placement base part 52A. Moreover, FIG. 9C is a diagram when the circuit board 90A is viewed from the side of a front surface 91Aa of a flexible substrate 91A. FIG. 9D is a diagram when the circuit board 90A is viewed from the side of a back surface 91Ab of the flexible substrate 91A.

As illustrated in FIG. 9A, the configuration of the holder 50A when the flat surface part 52Aa of the circuit board placement base part 52A is viewed from directly above is only different in that the end parts 53a and 54a of the terminal members 53 and 54 do not exist, and is the same as the holder 50 in the electronic pen 1 of the first embodiment. In the second embodiment, the configuration of the holder 50A on the opposite side to the flat surface part 52Aa of the circuit board placement base part 52A is different from the holder 50 of the first embodiment.

Specifically, as illustrated in FIG. 9B, on the opposite side to the side of the flat surface part 52Aa of the circuit board placement base part 52A in a tubular part 51A of the holder 50A in this second embodiment, a groove 51g with a V-shape for preventing one end 41a and the other end 41b of the coil 41 from protruding from the side circumferential surface of the tubular part 51A is formed along the axial center direction. In addition, an opening recess 51h that communicates with the housing part 51b of the writing pressure detector 80 is formed. The groove 51g is formed from the pen tip side of the tubular part 51A to the position of the opening recess 51h.

In this case, the opening recess 51h is formed on the side of the circuit board placement base part 52A relative to the position of the step part 51d of the holder 50A in the axial center direction. Therefore, this opening recess 51h becomes the state of being covered by the cartridge chassis component 60 when the cartridge chassis component 60 and the holder 50A are joined.

As illustrated in FIG. 9C, the flexible substrate 91A of the circuit board 90A of this second embodiment includes an extending part 98 that further extends from the writing pressure detector placement part 93 in the longitudinal direction. This extending part 98 is configured in such a manner that the width of the connecting part to the writing pressure detector placement part 93 is small, and is set to easily bend at this part.

On the front surface 91Aa of the flexible substrate 91A in this extending part 98, line patterns 981 and 982 connected to the electrically-conductive pad patterns 931 and 932, respectively, formed at the writing pressure detector placement part 93 are formed. Furthermore, at the extending part 98, as illustrated in FIG. 9C and FIG. 9D, the line patterns 981 and 982 on the front surface 91Aa of the flexible substrate 91A are connected to electrically-conductive pads 985 and 986 on a back surface 91Ab of the flexible substrate 91A via through-holes 983 and 984, respectively. In this example, a double-sided tape 97a is disposed on the side of the front surface 91Aa of the flexible substrate 91A in the extending part 98 although diagrammatic representation is omitted.

In an electronic pen 1A of this second embodiment, as illustrated in FIG. 10A, the circuit board 90A is bent at the part of the line part 94. In addition, the part of the extending part 98 can also be bent with respect to the writing pressure detector placement part 93.

FIG. 10B illustrates a sectional view of a joining part between the signal transmitter 40 of the electronic pen 1A of this second embodiment and the holder 50A. In this second embodiment, the circuit board 90A is bent at the place of the line part 94 as illustrated in FIG. 10A similarly to the first embodiment, and the writing pressure detector placement part 93 to which the writing pressure detector 80 is attached and the extending part 98 are inserted into the housing part 51b from the opening part 51bm of the tubular part 51A of the holder 50A from a direction orthogonal to the axial center direction.

Then, as illustrated in FIG. 10B, the extending part 98 is located in the opening recess 51h that communicates with the housing part 51b. In this state, the writing pressure detector placement part 93 is bonded to the wall part 51e by the double-sided tape and thereby the writing pressure detector 80 is housed in the housing part 51b in the state in which it can receive the pressure applied to the core body 30.

Then, the extending part 98 is fixed to the bottom part of the opening recess 51h through bonding of the front surface 91Aa of the flexible substrate 91A by the double-sided tape. Then, as illustrated in FIG. 10C, the state is obtained in which the electrically-conductive pads 985 and 986 formed on the side of the back surface 91Ab of the flexible substrate 91A in the extending part 98 are exposed from the opening recess 51h of the tubular part 51A of the holder 50.

Then, the ferrite core 42 and the core pipe member 43 of the signal transmitter 40 are fitted into the tubular part 51A of the holder 50A and the signal transmitter 40 is joined to the holder 50A. Thereafter, as illustrated in FIGS. 10B and 10C, the one end 41a and the other end 41b of the coil 41 wound around the ferrite core 42 are led to the place of the opening recess 51h along the inside of the V-shaped groove 51g of the tubular part 51A. Then, the one end 41a and the other end 41b of the coil 41 are electrically connected to the electrically-conductive pads 985 and 986, respectively, exposed in the opening recess 51h by soldering or the like, for example.

In the above-described manner, according to this second embodiment, the extending part 98 is disposed in the circuit board 90A and electrical connection to the one end 41a and the other end 41b of the coil 41 can be directly carried out in this extending part 98. Due to this, the terminal members 53 and 54 formed on the tubular part 51 by using an MID technique as in the case of the electronic pen 1 of the first embodiment can be made unnecessary.

Modification Examples of Second Embodiment

First Modification Example

In the electronic pen 1A of the above-described second embodiment, the opening recess 51h that exposes the extending part 98 to the external is formed on the pen tip side of the housing part 51b. Thus, in the flexible substrate 91A of the circuit board 90A, the extending part 98 is bent to extend to the pen tip side as illustrated in FIG. 10A, and the state is made in which the side of the back surface 91Ab of the flexible substrate 91A in the extending part 98 is exposed from the opening recess 51h. For this reason, in the above-described second embodiment, the electrically-conductive pads 985 and 986 connected to the line patterns 981 and 982 on the side of the front surface 91Aa via the through-holes 983 and 984 need to be formed on the side of the back surface 91Ab in the extending part 98.

Figure 11A:
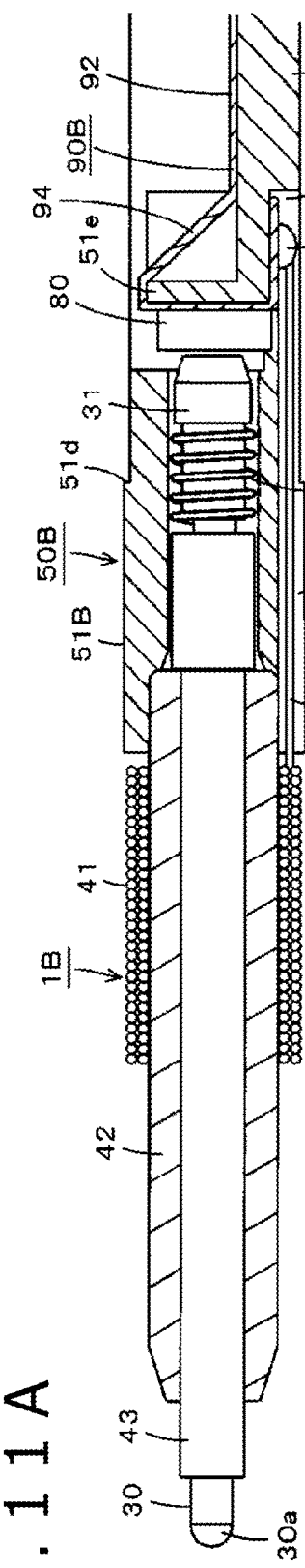
FIGS. 11A-11C depict partially enlarged views of another example of the electronic pen main body of the second embodiment of the electronic pen according to the present disclosure.

The electronic pen 1B of an example of FIG. 11A is an example in which the configuration is made to eliminate the need to form a conductor pattern on the back surface side of the flexible substrate 91A in the extending part 98 of the circuit board 90A. This FIG. 11A illustrates a sectional view of a joining part between the signal transmitter 40 of the electronic pen 1B of this second embodiment and a holder 50B. In the electronic pen 1B of the example of this FIG. 11A, the same part as the electronic pen 1A of the second embodiment is given the same reference numeral and detailed description thereof is omitted.

In the electronic pen 1B of the example of this FIG. 11A, an opening recess 51hB that communicates with the housing part 51b of a tubular part 51B of the holder 50B is made on the side of a circuit board placement base part 52B of the holder 50B relative to the housing part 51b. If this is employed, when the writing pressure detector placement part 93 of a circuit board 90B is housed in the housing part 51b, an extending part 98B thereof becomes the state in which the side of the front surface 91Aa of the flexible substrate 91A is exposed through the opening recess 51hB.

Therefore, in the electronic pen 1B of this example, in the extending part 98B of the circuit board 90B, electrically-conductive pads 987 and 988 are formed on the side of the front surface 91Aa of the flexible substrate 91A instead of the line patterns 981 and 982 as illustrated in FIG. 11A, and the through-holes 983 and 984 and the electrically-conductive pads 985 and 986 on the back surface 91Ab are not made. Furthermore, a V-shaped groove 51gB formed in the tubular part 51B of the holder 50B is formed from the pen tip side of the tubular part 51B to the position of the opening recess 51hB.

Then, after the ferrite core 42 and the core pipe member 43 of the signal transmitter 40 are fitted into the holder 50B, the one end 41a and the other end 41b of the coil 41 are led to the opening recess 51hB along the inside of the groove 51gB. Then, the one end 41a and the other end 41b of the coil 41 are electrically connected to the electrically-conductive pads 987 and 988, respectively, exposed in the opening recess 51hB by soldering or the like, for example.

In this case, the opening recess 51hB is formed on the side of the circuit board placement base part 52B relative to the position of the step part 51d of the holder 50B in the axial center direction. Therefore, this opening recess 51hB becomes the state of being covered by the cartridge chassis component 60 when the cartridge chassis component 60 and the holder 50B are joined.

According to the example of this FIG. 11A, there is an effect that it suffices to only generate a conductor pattern for electrical connection on a single surface side of the flexible substrate 91A of the circuit board 90B.

Second Modification Example

Figure 11B:
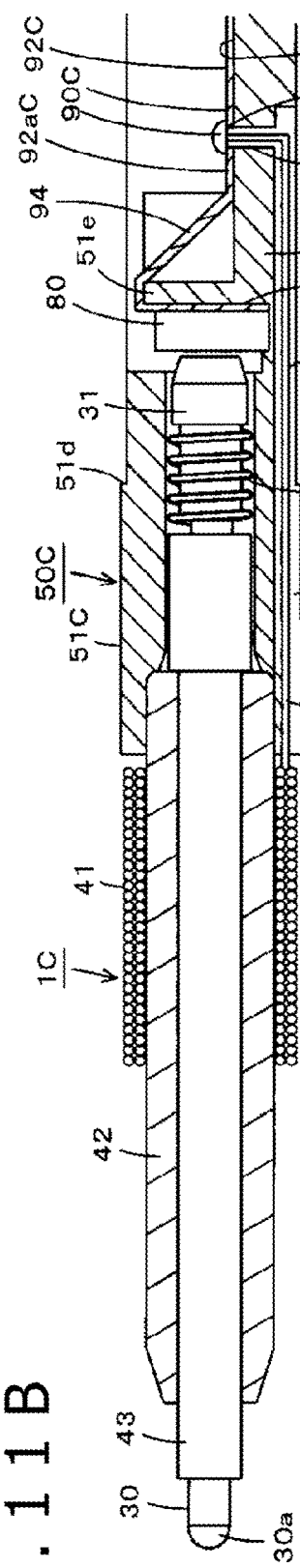

FIG. 11B is a diagram for explaining an electronic pen 1C of a second example of the modification examples of the second embodiment. This FIG. 11B also illustrates a sectional view of a joining part between the signal transmitter 40 of the electronic pen 1C of this example and a holder 50C.

In the electronic pen 1C of this second example, as a circuit board 90C, a configuration that does not have the extending part 98 but includes the circuit placement part 92, the writing pressure detector placement part 93, and the line part 94 similarly to the circuit board 90 in the electronic pen 1 of the first embodiment is employed. However, in the circuit board 90C of this second example, through-holes 99a and 99b connected to the conductor patterns 96a and 96b are formed at longitudinal-direction positions at which the cut-out parts 92a and 92b of the circuit board 90 are formed in the first embodiment as illustrated in FIG. 11B.

Furthermore, penetration holes 55a and 55b that penetrate from the back side of a flat surface part 52aC to the flat surface part 52aC are formed at the positions at which the through-holes 99a and 99b are located when the circuit board 90C is placed on the flat surface part 52aC in a circuit board placement base part 52C of the holder 50C. Moreover, a V-shaped groove 51gC formed in the holder 50C is formed from the pen tip side to the positions at which the penetration holes 55a and 55b are formed in the axial center direction.

In addition, in the electronic pen 1C of this second example, as illustrated in FIG. 11B, the one end 41a and the other end 41b of the signal transmitter 40 are led to the positions at which the penetration holes 55a and 55b are formed along the inside of the groove 51gC. Moreover, the one end 41a and the other end 41b are led out to the side of a front surface 91aC of a flexible substrate 91C of the circuit board 90C via the penetration holes 55a and 55b, respectively, and via the through-holes 99a and 99b of the circuit board 90C. Then, on the front surface 91aC of a flexible substrate 91C in a circuit placement part 92C of the circuit board 90C, the one end 41a and the other end 41b are electrically connected to the conductor patterns 96a and 96b by soldering or the like, for example.

Third Modification Example

Figure 11C:
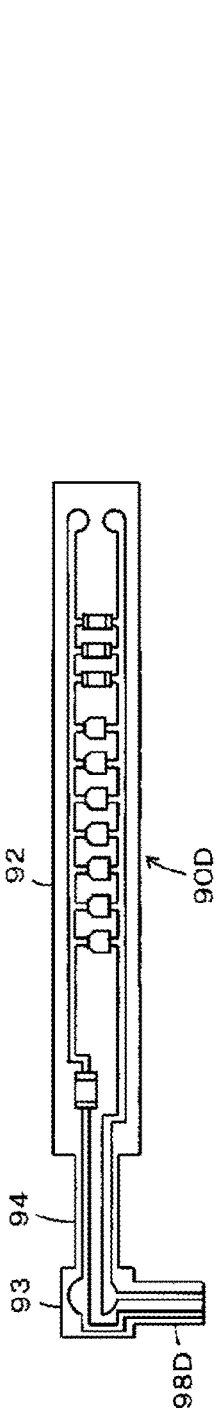

In the electronic pen 1A of the second embodiment and the electronic pen 1B of the first example of the modification examples, the extending parts 98 and 98B are formed to extend from the writing pressure detector placement part 93 in the longitudinal direction in the circuit boards 90A and 90B. However, as illustrated in FIG. 11C, a circuit board 90D may be formed in such a manner that an extending part 98D that extends the flexible substrate 91 from the writing pressure detector placement part 93 is extended in not the longitudinal direction but the short-side direction of the circuit board 90.

In the case of this third example, an opening recess is formed in a direction orthogonal to the direction in which the opening part 51bm of the housing part 51b is oriented in a holder 50D (not illustrated), and the extending part 98D is exposed to the external from the opening recess. Furthermore, a V-shaped groove of a tubular part 51D (not illustrated) of the holder 50D is also formed to correspond to the opening recess.

Third Embodiment

In the above-described embodiments, one package component using a MEMS element is employed as the writing pressure detector. However, the configuration of the writing pressure detector is not limited thereto. A third embodiment is the case of using a writing pressure detector with a configuration that includes first and second electrodes that sandwich a dielectric and detects the writing pressure as change in the capacitance by changing the contact area between the first electrode and the dielectric according to the pressure applied to a core body (refer to Patent Document 1).

In this third embodiment, only the configuration of the writing pressure detector and the configuration of a tubular part of a holder unit change and the other configuration is formed similarly to the above-described embodiments. FIGS. 12A and 12B depict diagrams for explaining the configuration of a writing pressure detector 80E and a holder 50E in an electronic pen 1E of this third embodiment. FIG. 12A is a diagram that illustrates the writing pressure detector 80E in a disassembled manner in consideration of assembling into the holder 50E and illustrates the part of the tubular part 51E that houses and holds this writing pressure detector 80E. Furthermore, FIG. 12B is a longitudinal sectional view in the state in which the writing pressure detector 80E is housed and held in the tubular part 51E of the holder 50E. In FIG. 12, the same part as the electronic pen 1 of the above-described first embodiment is given the same reference numeral.

The writing pressure detector 80E of this example also forms a capacitance-variable capacitor whose capacitance changes according to the writing pressure applied to the core body. As illustrated in FIGS. 12A and 12B, the writing pressure detector 80E of this example is composed of a plurality of components of a dielectric 801, a terminal member 802, a holding member 803, an electrically-conductive member 804, and a coil spring 805. The terminal member 802 forms the first electrode of the capacitance-variable capacitor formed of the writing pressure detector 80E. Furthermore, the electrically-conductive member 804 and the coil spring 805 are electrically connected to form the second electrode of the capacitance-variable capacitor.

Meanwhile, as illustrated in FIGS. 12A and 12B, the tubular part 51E of the holder 50E of this example includes a housing part 51$b$E having an opening part 51$bm$E oriented in a direction orthogonal to the axial center direction. In addition, the tubular part 51E has a configuration in which the plurality of components configuring the writing pressure detector 80E are lined up in the axial center direction and are housed in this housing part 51$b$E and the hollow part of the tubular part 51E that communicates with this housing part 51$b$E.

As illustrated in FIG. 12A, the dielectric 801 is formed into a plate shape having diameter and thickness that allow the dielectric 801 to be housed in the housing part 51$b$E of the tubular part 51E of the holder 50E. Furthermore, the terminal member 802 is formed of a circular-disc-shaped electrically-conductive member, for example, a plate-shaped body of an electrically-conductive metal, having diameter and thickness that allow the terminal member 802 to be housed in the housing part 51$b$E of the tubular part 51E of the holder 50E together with the dielectric 801 in the state of being in contact with one surface side of the dielectric 801 in the axial center direction.

Furthermore, in this third embodiment, the terminal member 802 is placed on a writing pressure detector placement part 93E of a circuit board 90E and is electrically connected to an electrically-conductive pad formed on this writing pressure detector placement part 93E and is fixed. In the circuit board 90E in this third embodiment, one electrically-conductive pad electrically connected to the terminal member 802 is formed on the writing pressure detector placement part 93E. Thus, the number of line patterns formed at a line part 94E is set to one. Moreover, at a circuit placement part 92E of the circuit board 90E, an electrically-conductive pad connected to the elastic member configuring part of the second electrode of the writing pressure detector 80E, an end part of the coil spring 805 in this example, is formed as described later. The other configuration of the circuit board 90E is the same as the circuit board 90 of the first embodiment.

In the plurality of components configuring the writing pressure detector 80E, the dielectric 801 and the terminal member 802, which are the components that do not move in the axial center direction in the hollow part of the tubular part 51E of the holder 50E, are inserted, as illustrated in FIG. 12A, into the housing part 51$b$E of this tubular part 51E from a direction orthogonal to the axial center direction through the opening part 51$bm$E oriented in the direction orthogonal to the axial center direction at the housing part 51$b$E of the tubular part 51E of the holder 50E, and are housed as illustrated in FIG. 12B.

In this case, the terminal member 802 is fixed to the writing pressure detector placement part 93E of the circuit board 90E as described above. Thus, similarly to the case of the above-described first embodiment, the circuit board 90E is bent at the place of the line part 94E as illustrated in FIG. 12A and the writing pressure detector placement part 93E fixed to the terminal member 802 is let in the housing part 51$b$E.

Then, for the circuit board 90E, as illustrated in FIG. 12B, the part of the circuit placement part 92E is placed on a flat surface part 52$a$E of a circuit board placement base part 52E of the holder 50E and this circuit placement part 92E is bonded and fixed to the flat surface part 52$a$E of the circuit board placement base part 52E by a double-sided tape disposed on the back surface side of the part of the circuit placement part 92E of the flexible substrate 91E.

As illustrated in FIGS. 12A and 12B, an L-shaped protrusion 802$b$ that protrudes toward the dielectric 801 is formed in the terminal member 802. By the L-shaped protrusion 802$b$ of this terminal member 802, the end part of the dielectric 801 on the side of the opening part 51$bm$E is pressed and the dielectric 801 is held so as not to drop off from the housing part 51$b$E.

The holding member 803 forming the writing pressure detector 80E includes a circular column shape part 803$a$ in which a recessed hole 803$b$ into which the core body 30 is press-fitted is made on the side of the core body 30 in the axial center direction and includes a ring-shaped protruding part 803$c$ in which a recessed hole into which the electrically-conductive member 804 is fitted is made on the opposite side to the side of the recessed hole 803$b$ in the axial center direction.

The outer diameter (one part in the circumferential direction) of the circular column shape part 803$a$ of the holding member 803 is selected to be slightly smaller than an inner diameter d2 of the hollow part of the tubular part 51E. Furthermore, the outer diameter of the ring-shaped protruding part 803$c$ of the holding member 803 is selected to be smaller than the outer diameter of the circular column shape part 803$a$ and be smaller than the inner diameter of the coil spring 805 forming the elastic member. In this case, a step part is formed between the ring-shaped protruding part 803$c$ and the circular column shape part 803$a$. This step part is for locking an end part of the coil spring 805.

Furthermore, in this embodiment, engagement protruding parts 803$d$ and 803$e$ are formed on the side circumferential surface of the circular column shape part 803$a$ of the holding member 803 and engagement holes 51$ia$ and 51$ib$ (see FIG. 12B) with which the engagement protruding parts 803$d$ and 803$e$ engage are formed in a side circumferential surface of the tubular part 51E of the holder 50E. This allows the holding member 803 to move in the axial center direction thereof even in the state in which the engagement protruding parts 803d and 803e are engaged with the engagement holes 51ia and 51ib.

The electrically-conductive member 804 is formed of an elastic member that has electrical conductivity and is elastically deformable and is composed of silicone conductive rubber or pressure conductive rubber, for example. The center line positions of a larger-diameter part 804a and a smaller-diameter part 804b of this electrically-conductive member 804 are set identical. Furthermore, the end surface of the larger-diameter part 804a on the opposite side to the smaller-diameter part 804b is configured to have a curved surface part that bulges into a bullet shape as illustrated in FIG. 12B.

Furthermore, the coil spring 805 has a wound part 805a that is formed of a coil spring having electrical conductivity, for example, and has elasticity and a terminal piece 805b at one end part of this wound part 805a, and has a connecting part 805c at the other end part of the wound part 805a. The wound part 805a of the coil spring is set to have a diameter that allows the electrically-conductive member 804 to be housed in the wound part 805a without contact and is smaller than the diameter of the circular column shape part 803a of the holding member 803.

The connecting part 805c of the coil spring 805 is inserted into the bottom part of a recessed hole formed in the ring-shaped protruding part 803c of the holding member 803 (see FIG. 12B). Therefore, when the smaller-diameter part 804b of the electrically-conductive member 804 is press-fitted to the ring-shaped protruding part 803c of the holding member 803, the state is obtained in which the end surface of the smaller-diameter part 804b of the electrically-conductive member 804 gets contact with the connecting part 805c of the coil spring 805 having electrical conductivity and is electrically connected.

In this third embodiment, first, the dielectric 801 and the terminal member 802 placed and fixed onto the writing pressure detector placement part 93E of the circuit board 90E in the components configuring the writing pressure detector 80E are housed in the housing part 51bE of the tubular part 51E of the holder 50E through the opening part 51bmE.

Next, in this example, the smaller-diameter part 804b of the electrically-conductive member 804 is press-fitted into the recessed hole of the ring-shaped protruding part 803c of the holding member 803. In addition, the wound part 805a of the coil spring 805 is disposed to be brought to the periphery of the ring-shaped protruding part 803c and the electrically-conductive member 804.

Next, this unit obtained by combining the holding member 803, the electrically-conductive member 804, and the coil spring 805 is inserted into the hollow part of the tubular part 51E in the axial center direction from the side of the electrically-conductive member 804 through an opening part 51aE of the tubular part 51E. Then, the engagement protruding parts 803d and 803e formed on the circular column shape part 803a of the holding member 803 are inserted in the axial center direction until engaging with the engagement holes 5lia and 5lib formed in a side circumferential surface of the tubular part 51E.

Due to this, irrespective of the biasing force of the coil spring 805 in the axial center direction, the holding member 803 is locked in the hollow part of the tubular part 51E without dropping off from the opening part 51aE of the tubular part 51E of the holder 50E. Furthermore, in this state, the dielectric 801 and the terminal member 802 are pressed against the side of a wall part 51eE due to the biasing force of the coil spring 805 in the axial center direction. This prevents the dielectric 801 from dropping off from the opening part 51bmE of the housing part 51bE of the tubular part 51E.

Next, the terminal piece 805b of the coil spring 805 is soldered to the circuit board 90E in the state in which the whole of the plurality of components configuring the writing pressure detector 80E are housed and locked in the hollow part and the housing part 51bE of the tubular part 51E of the holder 50E in the above-described manner.

In the writing pressure detector 80E of this example, when a pressure is applied to the core body 30, the state is obtained in which the holding member 803 presses the electrically-conductive member 804 against the dielectric 801 against the elastic biasing force of the coil spring 805 according to the applied pressure, and the contact area between the dielectric 801 and the electrically-conductive member 804 changes according to the applied pressure. As a result, the capacitance obtained between the terminal member 802 and the terminal piece 805b of the coil spring 805 changes according to the applied pressure. Thus, similarly to the above-described first embodiment, the resonant frequency of the resonant circuit composed of the coil 41, the capacitor disposed on the circuit board 90E, and the writing pressure detector 80E changes and is transmitted to the position detecting device as writing pressure information.

In the above-described manner, in the electronic pen 1E of the third embodiment, the terminal member 802 forming one electrode of the variable-capacitance capacitor forming the writing pressure detector 80E is placed on the writing pressure detector placement part 93E of the circuit board 90E in advance and is electrically connected and fixed. Therefore, an effect is provided that, after the tubular part 51E of the holder 50E is caused to hold the writing pressure detector 80E, a step of electrical connection by soldering between the terminal member 802 and the circuit board 90E becomes unnecessary although a step of electrical connection by soldering between the terminal piece 805b of the coil spring 805 forming the other electrode of the variable-capacitance capacitor forming the writing pressure detector 80E and the circuit board 90E is necessary.

In the example of FIG. 12, only the terminal member 802 is placed on the writing pressure detector placement part 93E of the circuit board 90E and is electrically connected and fixed. However, an electrode piece or conductor pad pattern to be connected to the terminal piece 805b of the coil spring 805 may be formed on this writing pressure detector placement part 93E and the terminal piece 805b of the coil spring 805 may be electrically connected to the electrode piece or conductor pad pattern by soldering or the like. In this case, at the line part 94E, a line pattern electrically connected to the electrode piece or conductor pad pattern connected to the terminal piece 805b of the coil spring 805 is formed in addition to the line pattern electrically connected to the terminal member 802.

Fourth Embodiment

The above embodiments are the cases of an electronic pen of the electromagnetic induction system. However, this disclosure can be applied also to an electronic pen of the active capacitive coupling system that indicates a position by transmitting a predetermined signal to a position detecting device by the capacitive coupling system.

Also in this electronic pen of the active capacitive coupling system, parts similar to those of the above-described electronic pen can be used as constituent components.

However, in the case of the electronic pen of the active capacitive coupling system, a core body 30F (see FIG. 13 to be described later) composed of a material having electrical conductivity, for example, a metal, is used instead of the core body 30 composed of a resin in the above-described first to third embodiments. Furthermore, it is assumed that the coil 41 wound around the ferrite core 42 forms a circuit for obtaining a charging current that charges an electricity storage element by the electromagnetic induction system. Moreover, a signal transmitting circuit for supplying a signal to the electrically-conductive core body 30F is disposed on the circuit board. In addition, a configuration of electrical connection for supplying a signal from the signal transmitting circuit of the circuit board to the core body 30F is added. Therefore, in this fourth embodiment, a component for signal transmission is composed of the core body 30F and the signal transmitting circuit.

An example of an electronic circuit formed on the circuit board of an electronic pen 1F of the capacitive coupling system in this fourth embodiment will be described with reference to FIG. 13.

Figure 13:
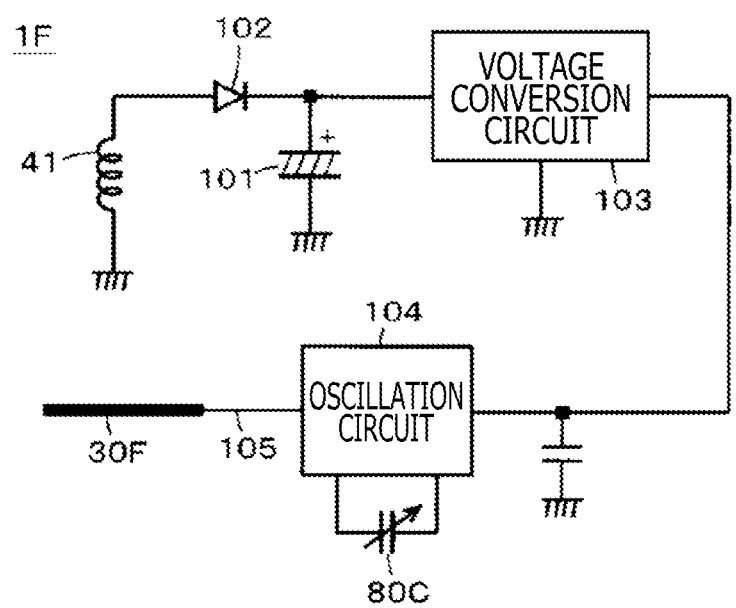
FIG. 13 is a circuit diagram illustrating an electronic circuit example of a fourth embodiment of the electronic pen according to the present disclosure.

In FIG. 13, numeral 101 denotes an electric double-layer capacitor and numeral 102 denotes a diode for rectification. Numeral 103 denotes a voltage conversion circuit and numeral 104 denotes an oscillation circuit forming the signal transmitting circuit of this example. As illustrated in FIG. 13, in this example, one end of the coil 41 is connected to the anode of the diode 102 and the other end is grounded (GND). Furthermore, one end of the electric double-layer capacitor 101 is connected to the cathode of the diode 102 and the other end is grounded.

The core body (electrode core) 30F penetrates through a penetration hole 43Fa of a core pipe member 43F of a ferrite core 42F around which the coil 41 is wound and is physically joined (engaged) to, for example, the writing pressure detector 80 forming a variable-capacitance capacitor 80C. In addition, the electrode core 30F is electrically connected to the oscillation circuit 104 of the circuit board through a connection line 105. Therefore, a pressure (writing pressure) applied to the electrode core 30F is transmitted to the writing pressure detector 80 due to the above-described physical joining of the electrode core 30F and the writing pressure detector 80 forming the variable-capacitance capacitor 80C. In addition, a transmission signal from the oscillation circuit 104 is transmitted from the electrode core 30F via the connection line 105.

The oscillation circuit 104 generates a signal whose frequency changes according to the capacitance of the variable-capacitance capacitor 80C of the writing pressure detector 80 and supplies the generated signal to the electrode core 30F. The signal from the oscillation circuit 104 is radiated from the electrode core 30F as an electric field based on the signal. The oscillation circuit 104 is formed of an LC oscillation circuit using resonance by a coil and a capacitor, for example. In a tablet that detects a coordinate position indicated by the electronic pen 1F of this embodiment, the writing pressure applied to the electrode core 30F can be obtained based on the frequency of this signal.

The voltage conversion circuit 103 converts the voltage stored in the electric double-layer capacitor 101 to a constant voltage and supplies it as a power supply of the oscillation circuit 104. This voltage conversion circuit 103 may be buck-type one with which the constant voltage becomes lower than the voltage across the electric double-layer capacitor 101 or may be boost-type one with which the constant voltage becomes higher than the voltage across the electric double-layer capacitor 101. Furthermore, the voltage conversion circuit 103 may be buck-boost-type one that operates as a buck circuit when the voltage across the electric double-layer capacitor 101 is higher than the constant voltage and operates as a boost circuit when the voltage across the electric double-layer capacitor 101 is lower than the constant voltage.

When the electronic pen 1F of this embodiment is mounted on a charger that is not illustrated, an induced electromotive force is generated in the coil 41 due to an alternating magnetic field generated by the charger and the electric double-layer capacitor 101 is charged through the diode 102.

When the electronic pen 1F of this embodiment normally operates (when charge operation is not carried out), the potential of the coil 41 becomes a fixed potential (in this example, ground potential (GND)) and thus the coil 41 acts as a shield electrode disposed around the electrode core 30F. The fixed potential of the coil 41 when the electronic pen 1F normally operates is not limited to the ground potential and may be a positive potential of a power supply or be an intermediate potential between the positive potential of the power supply and the ground potential.

In the above-described fourth embodiment, the electronic pen 1F converts the writing pressure detected by the writing pressure detector 80 to the frequency and supplies it to electrode core 30F. However, the signal attribute to which the writing pressure is made to correspond is not limited to the frequency and the writing pressure may be made to correspond to the phase of the signal, the number of times of intermittence of the signal, or the like.

Other Embodiments or Modification Examples

The above-described embodiments are explained as the cases in which this disclosure is applied to the electronic pen main body with a cartridge shape housed in the chassis of the electronic pen. However, it goes without saying that it is possible to employ not such an electronic pen main body but a configuration in which the signal transmitter, the holder, and the circuit board are directly housed in the chassis of the electronic pen.

In the above-described embodiments, the writing pressure information detected by the writing pressure detector is sent out together with the signal for position detection from the signal transmitter. However, a wireless transmitter may be disposed on the circuit placement part of the circuit board and the configuration may be made in such a manner that the writing pressure information is transmitted to the position detecting device through this wireless transmitter separately from the signal for position detection.

Furthermore, in the electronic pen of the capacitive coupling system in the above-described fourth embodiment, a signal is sent out from the core body. However, a configuration may be employed in which, for example, a sleeve-shaped component that surrounds the core body is formed by a conductor separately from the core body and a signal is sent out to the position detecting device through the conductor or by using both the conductor and the core body.

Moreover, in the above-described embodiments, the circuit placement part of the circuit board is bonded and fixed to the circuit board placement base part of the holder by a double-sided tape. However, it goes without saying that the circuit placement part may be bonded and fixed not only by the double-sided tape but by applying an adhesive.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

DESCRIPTION OF REFERENCE SYMBOLS

1 Electronic pen,
2 Chassis,
3 Electronic pen main body,
30 Core body,
40 Signal transmitter,
41 Coil,
42 Ferrite core,
43 Core pipe member,
50 Holder,
51 Tubular part,
52 Circuit board placement base part,
60 Cartridge chassis component,
80 Writing pressure detector,
90 Circuit board,
91 Flexible substrate,
92 Circuit placement part,
93 Writing pressure detector placement part,
94 Line part

The invention claimed is:

1. A replaceable component of an electronic pen, comprising:
   a writing pressure detector configured to detect a pressure; and
   a circuit board comprising:
      a flexible substrate;
      a circuit placement part, one or more circuits coupled to the circuit placement part;
      a writing pressure detector placement part, the writing pressure detector coupled to the writing pressure detector placement part;
      a line part between the writing pressure detector placement part and the circuit placement part, a conductive line pattern formed at the line part that electrically couples the writing pressure detector with the one or more circuits; and
      an extending part that extends from the writing pressure detector placement part in a direction that is opposite the line part and the circuit placement part.

2. The replaceable component according to claim 1, further comprising a holder that holds the writing pressure detector and the circuit board.

3. The replaceable component according to claim 2, wherein the holder includes a first recess that receives the writing pressure detector and a second recess the circuit board.

4. The replaceable component according to claim 2, wherein the circuit board is coupled to the holder by double-sided tape.

5. The replaceable component according to claim 2, wherein a longitudinal length of the flexible substrate extends in a direction of a longitudinal length of the holder.

6. The replaceable component according to claim 1, wherein the writing pressure detector is arranged such that when the replaceable component is placed in the electronic pen the writing pressure detector is configured to receive pressure.

7. The replaceable component according to claim 6, wherein the writing pressure detector includes first and second electrodes and a dielectric between the first and second electrodes, the writing pressure detector including a contact area between the first electrode and the dielectric, wherein the contact area is configured to change in response to pressure applied to the core body and capacitance is varied according to the change in the contact area, and wherein the second electrode is located on and coupled to the writing pressure detector placement part of the circuit board.

8. The replaceable component according to claim 1, wherein a width of the line part and a width of the extending part are less than widths of the writing pressure detector placement part and the circuit placement part.

9. The replaceable component according to claim 1, wherein the writing pressure detector placement part is at an angle that is transverse with respect to the circuit placement part.

10. The replaceable component according to claim 9, wherein a portion of the line part is bent to place the writing pressure detector placement part at the angle that is transverse with respect to the circuit placement part.

11. The replaceable component according to claim 1, wherein the extending part is at an angle that is transverse with respect to the writing pressure detector placement part.

12. The replaceable component according to claim 1, wherein a first surface of the extending part includes a plurality of line patterns, the extending part include a plurality of through vias, a second surface of the extending part including a plurality of conductive pads, the second surface being opposite the first surface, the plurality of conductive pads being electrically coupled to the plurality of conductive line patterns, respectively, on the first surface of the extending part by the conductive through vias, respectively.

13. A method comprising:
   forming a replaceable component of an electronic pen, the forming comprising:
      forming, in a longitudinal direction of a flexible substrate, a circuit placement part, a writing pressure detector placement part, and an extending part that extends from the writing pressure detector placement part in a direction that is opposite the circuit placement part;
      forming a conductor pattern for one or more circuits on the circuit placement part;
      coupling a writing pressure detector to the writing pressure detector placement part; and
      forming a conductive line part between the writing pressure detector placement part and the circuit placement part that couple the writing pressure detector placement part to the circuit placement part.

14. The method according to claim 13, further comprising coupling the flexible substrate to a holder.

15. The method according to claim 14, wherein when the flexible substrate is coupled to the holder, the writing pressure detector and the writing pressure detector placement part extend in a direction that is perpendicular to the circuit placement part.

16. The method according to claim 14, wherein coupling the flexible substrate to the holder comprises using double-sided tape to couple the flexible substrate to the holder.

17. The method according to claim 14, wherein the flexible substrate includes one or more sections having a reduced width relative to widths of the writing pressure detector placement part and the circuit placement part.

18. The method according to claim 17, wherein the one or more sections are a plurality of sections and include the extending part and the conductive line part.

19. The method according to claim 17, further comprising forming a plurality of line patterns on a first surface of the extending part.

20. The method according to claim 19, further comprising forming conductive through vias in the extending part and forming a plurality of conductive pads on a second surface of the extending part, the second surface being opposite the first surface, the plurality of conductive pads being electrically coupled to the plurality of conductive line patterns, respectively, on the first surface of the extending part by the conductive through vias, respectively.

\* \* \* \* \*